United States Patent
Li et al.

(10) Patent No.: US 11,284,456 B2
(45) Date of Patent: Mar. 22, 2022

(54) METHOD AND APPARATUS FOR OBTAINING IDENTIFIER OF TERMINAL DEVICE

(71) Applicant: HUAWEI TECHNOLOGIES CO., LTD., Guangdong (CN)

(72) Inventors: He Li, Shanghai (CN); Jing Chen, Shanghai (CN); Huan Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/751,551

(22) Filed: Jan. 24, 2020

(65) Prior Publication Data

US 2020/0163132 A1 May 21, 2020

Related U.S. Application Data

(63) Continuation of application No. PCT/CN2015/097088, filed on Jul. 25, 2018.

(30) Foreign Application Priority Data

Jul. 31, 2017 (CN) .......................... 201710643843.7

(51) Int. Cl.
  *H04W 76/11* (2018.01)
  *H04L 29/06* (2006.01)
  (Continued)

(52) U.S. Cl.
  CPC ......... *H04W 76/11* (2018.02); *H04L 63/0272* (2013.01); *H04W 12/06* (2013.01); *H04W 60/00* (2013.01); *H04W 88/16* (2013.01)

(58) Field of Classification Search
  CPC ..... H04W 60/00; H04W 12/06; H04W 12/04; H04W 60/06; H04W 12/069;
  (Continued)

(56) References Cited

U.S. PATENT DOCUMENTS

2002/0006808 A1 1/2002 Onaka et al.
2007/0019643 A1* 1/2007 Shaheen ............... H04W 60/00
  370/389
(Continued)

FOREIGN PATENT DOCUMENTS

CN 1340978 A 3/2002
CN 101034982 A 9/2007
(Continued)

OTHER PUBLICATIONS

3GPP TS 23.502 V0.2.0 (Feb. 2017), "3rd Generation Partnership Project; Technical Specification Group Services and System Aspects; Procedures for the 5G System; Stage 2 (Release 15)," Feb. 2017, 71 pages.

(Continued)

*Primary Examiner* — Kwasi Karikari
(74) *Attorney, Agent, or Firm* — Fish & Richardson P.C.

(57) ABSTRACT

This application discloses a method and an apparatus for obtaining an identifier of a terminal device. The method is performed by a gateway node and includes: receiving a first message sent by a terminal device, and sending a second message to a control plane node, where both the first message and the second message carry a temporary identifier of the terminal device; receiving a third message sent by the control plane node, where the third message is sent by the control plane node when the control plane node cannot obtain a permanent identifier of the terminal device; sending a fourth message to the terminal device based on the third message; receiving a fifth message sent by the terminal device, where the fifth message carries the permanent identifier of the terminal device; and sending the permanent identifier to the control plane node based on the fifth message.

4 Claims, 12 Drawing Sheets

(51) Int. Cl.
*H04W 12/06* (2021.01)
*H04W 60/00* (2009.01)
*H04W 88/16* (2009.01)

(58) Field of Classification Search
CPC ... H04W 76/10; H04W 12/041; H04W 36/14;
H04W 12/08; H04W 12/10; H04W 12/35;
H04W 12/72; H04W 12/75; H04W 36/00;
H04W 76/18; H04W 56/001; H04W
72/14; H04W 12/062; H04W 12/106;
H04W 36/0038; H04W 48/08; H04W
56/00; H04W 74/0891; H04W 76/00
See application file for complete search history.

(56) References Cited

U.S. PATENT DOCUMENTS

| | | | | |
|---|---|---|---|---|
| 2013/0242727 | A1* | 9/2013 | Shaikh | H04W 28/02 370/230 |
| 2014/0204905 | A1 | 7/2014 | Ranke et al. | |
| 2017/0164183 | A1* | 6/2017 | Suh | H04W 8/14 |
| 2017/0188223 | A1* | 6/2017 | Gundavelli | H04W 12/068 |

FOREIGN PATENT DOCUMENTS

| | | |
|---|---|---|
| CN | 101039181 A | 9/2007 |
| CN | 101090358 A | 12/2007 |
| CN | 101360323 A | 2/2009 |
| CN | 101400054 A | 4/2009 |
| CN | 101400148 A | 4/2009 |
| CN | 101505474 A | 8/2009 |
| CN | 101771992 A | 7/2010 |
| CN | 102625285 A | 8/2012 |
| CN | 102724649 A | 10/2012 |
| CN | 102833733 A | 12/2012 |
| EP | 2112841 A1 | 10/2009 |
| KR | 101625037 B1 | 5/2016 |
| WO | 2017095205 A1 | 6/2017 |

OTHER PUBLICATIONS

Motorola Mobility et al., "5G Registration via Untrusted Non-3GPP Access," 3GPP SA WG2 Meeting #122, S2-174885, San Jose Del Cabo, Mexico, Jun. 26-30, 2017, 12 pages.

Nokia et al., "23.502: Re-registration procedure via untrusted non-3GPP access," 3GPP SA WG2 Meeting #121, S2-173178, Hangzhou, P.R. China, May 15-19, 2017, 11 pages.

Extended European Search Report issued in European Application No. 18840814.0 dated Jun. 30, 2020, 10 pages.

Office Action issued in Chinese Application No. 201710643843.7 dated Jan. 13, 2020, 19 pages (with English translation).

PCT International Search Report and Written Opinion issued in International Application No. PCT/CN2018/097088 dated Sep. 28, 2018, 15 pages (with English translation).

* cited by examiner

METHOD AND APPARATUS FOR OBTAINING IDENTIFIER OF TERMINAL DEVICE

CROSS-REFERENCE TO RELATED APPLICATIONS

This application is a continuation of International Application No. PCT/CN2018/097088, filed on Jul. 25, 2018, which claims priority to Chinese Patent Application No. 201710643843.7, filed on Jul. 31, 2017. The disclosures of the aforementioned applications are hereby incorporated by reference in their entireties.

TECHNICAL FIELD

This application relates to the field of communications technologies, and in particular, to a method and an apparatus for obtaining an identifier of a terminal device.

BACKGROUND

Currently, a terminal device may access a network by using a 3rd generation partnership project (3GPP) technology, or may access a network by using a non-3GPP technology. When the terminal device accesses a 5G network, the terminal device needs an access and mobility management function (AMF) node regardless of whether the terminal device accesses the 5G network by using a 3GPP technology or a non-3GPP technology.

In the prior art, when the terminal device accesses the 5G network by using the non-3GPP technology and the terminal device is registered again rather than registered for the first time, the terminal device may negotiate with a non-3GPP interworking function (N3IWF) node, to establish an internet protocol security (IPsec) connection. Then, the terminal device may send a temporary identifier of the terminal device and a request message to the N3IWF node by using the IPsec connection. The request message is a message whose integrity is protected by using an integrity key. The N3IWF node selects an AMF node based on the temporary identifier, and sends the request message to the selected AMF node. After receiving the request message, the AMF node may verify integrity of the request message. If the verification performed by the selected AMF node on the integrity of the request message whose integrity is protected succeeds, it indicates that the AMF node stores a context of the terminal device, so that the terminal device successfully accesses the 5G network. The context is information generated after the terminal device is successfully registered for the first time, and includes information such as a permanent identifier of the terminal device and a security context. If the verification performed by the selected AMF node on the integrity of the request message fails, it indicates that the AMF node finds no context of the terminal device. In this case, the terminal device cannot successfully access the 5G network.

It can be learned from the foregoing descriptions that when the terminal device accesses the 5G network by using the non-3GPP technology and the terminal device accesses the network again, if the selected AMF node finds no context of the terminal device, the AMF node cannot determine an identifier of the terminal device, and consequently the terminal device cannot successfully access the network.

SUMMARY

Embodiments of this application provide a method and an apparatus for obtaining an identifier of a terminal device, to resolve a problem that in a related technology, an AMF cannot determine an identifier of a terminal device when the terminal device accesses a network again. The technical solutions are as follows:

According to a first aspect, a method for obtaining an identifier of a terminal device is provided. The method includes:

receiving, by a gateway node, a first message sent by a terminal device, and sending a second message to a control plane node, where both the first message and the second message carry a temporary identifier of the terminal device;

receiving, by the gateway node, a third message sent by the control plane node, where the third message is sent by the control plane node when the control plane node cannot obtain a permanent identifier of the terminal device;

sending, by the gateway node, a fourth message to the terminal device based on the third message, where the fourth message is used to respond to the first message;

receiving, by the gateway node, a fifth message sent by the terminal device, where the fifth message carries the permanent identifier of the terminal device; and sending, by the gateway node, the permanent identifier of the terminal device to the control plane node based on the fifth message.

In this embodiment of this application, when the control plane node cannot obtain a context of the terminal device, the control plane node may send, to the gateway node, the third message used to request the permanent identifier of the terminal device, and then the gateway node may forward the third message to the terminal device, to return the obtained permanent identifier to the control plane node. Therefore, it can be learned that in this embodiment of this application, even if the control plane node obtains no context of the terminal device, the control plane node can obtain the permanent identifier of the terminal device through forwarding of the gateway node, so that it is possible that the terminal device successfully accesses a network. Compared with a prior-art access procedure in which access needs to be performed again once access fails, the method provided in this embodiment of this application makes an access procedure more convenient and more proper.

Optionally, the sending, by the gateway node, a fourth message to the terminal device based on the third message includes:

when the third message carries an identity request message and the identity request message is used to request the permanent identifier of the terminal device, sending, by the gateway node, the fourth message to the terminal device by using a first internet protocol security IPsec connection between the gateway node and the terminal device, where the fourth message carries the identity request message and a first failure cause value, where the first failure cause value is used to notify the terminal device that the first IPsec connection fails, the first failure cause value is further used to instruct the terminal device to send an association parameter to associate the first IPsec connection with a second IPsec connection, the association parameter is a parameter used to associate the first IPsec connection with the second IPsec connection, and the second IPsec connection is an IPsec connection established after the first IPsec connection is disconnected.

Optionally, the fifth message carries an identity reply message and the association parameter, the identity reply message is used to respond to the identity request message, and the identity reply message carries the permanent identifier of the terminal device; and the sending, by the gateway node, the permanent identifier of the terminal device to the control plane node based on the fifth message includes:

sending, by the gateway node, a sixth message to the control plane node based on the association parameter, where the sixth message carries the identity reply message and an extensible authentication protocol/identity-response EAP-AKA'/Identity-Response message, and both the identity reply message and the EAP-AKA'/Identity-Response message carry the permanent identifier; or the sixth message carries the identity reply message, the identity reply message carries the EAP-AKA'/Identity-Response message, and the EAP-AKA'/Identity-Response message carries the permanent identifier; or sending, by the gateway node, a sixth message to the control plane node based on the association parameter, where the sixth message carries the identity reply message, and the identity reply message carries the permanent identifier of the terminal device.

In this embodiment of this application, the gateway node may directly send, to the terminal device, the fourth message that carries the identity request message, to request the permanent identifier from the terminal device. In this way, after receiving the permanent identifier sent by the terminal device, the gateway node may send the permanent identifier to the control plane node. In other words, the control plane node may obtain the permanent identifier through forwarding of the gateway node. In addition, the fourth message may further carry the first failure cause value, so that the terminal device may carry the association parameter, and then the gateway node may send the permanent identifier to the terminal device indicated by the association parameter.

Optionally, the sending, by the gateway node, a fourth message to the terminal device based on the third message includes:

when the third message carries an identity request message and the identity request message is used to request the permanent identifier of the terminal device, sending, by the gateway node, the fourth message to the terminal device by using a first IPsec connection between the gateway node and the terminal device, where the fourth message carries an extensible authentication protocol/identity-request EAP-AKA'/Identity-Request message and a first failure cause value, where the EAP-AKA'/Identity-Request message is used to trigger an authentication procedure for the terminal device, the first failure cause value is used to notify the terminal device that the first IPsec connection fails, the first failure cause value is further used to instruct the terminal device to send an association parameter to associate the first IPsec connection with a second IPsec connection, the association parameter is a parameter used to associate the first IPsec connection with the second IPsec connection, and the second IPsec connection is an IPsec connection established after the first IPsec connection is disconnected.

Optionally, the fifth message carries an EAP-AKA'/Identity-Response message and the association parameter, the EAP-AKA'/Identity-Response message is used to respond to the EAP-AKA'/Identity-Request message, and the EAP-AKA'/Identity-Response message carries the permanent identifier of the terminal device; and the sending, by the gateway node, the permanent identifier of the terminal device to the control plane node based on the fifth message includes:

sending, by the gateway node, a sixth message to the control plane node based on the association parameter, where the sixth message carries an identity reply message and the EAP-AKA'/Identity-Response message, the identity reply message is used to respond to the identity request message, and the identity reply message carries the permanent identifier of the terminal device; or the sixth message carries the identity reply message, the identity reply message carries the EAP-AKA'/Identity-Response message, and the EAP-AKA'/Identity-Response message carries the permanent identifier of the terminal device.

The gateway node may generate the EAP-AKA'/Identity-Request message based on the identity request message, to request the permanent identifier from the terminal device. In other words, the gateway node may request the permanent identifier from the terminal device when triggering authentication. A process of triggering authentication is combined with a process of obtaining the permanent identifier, so that a quantity of times of signaling interaction is reduced.

Optionally, the sending, by the gateway node, a fourth message to the terminal device based on the third message includes:

when the third message carries an identity request message and the identity request message is used to request the permanent identifier of the terminal device, sending, by the gateway node, the fourth message to the terminal device by using a first IPsec connection between the gateway node and the terminal device, where the fourth message carries a failure message and a first failure cause value, where the failure message is used to indicate that a context of the terminal device fails to be obtained, the first failure cause value is used to notify the terminal device that the first IPsec connection fails, the first failure cause value is further used to instruct the terminal device to send an association parameter to associate the first IPsec connection with a second IPsec connection, the association parameter is a parameter used to associate the first IPsec connection with the second IPsec connection, and the second IPsec connection is an IPsec connection established after the first IPsec connection is disconnected.

Optionally, the fifth message carries a registration request message and the association parameter, and the registration request message carries the permanent identifier of the terminal device, and the sending, by the gateway node, the permanent identifier of the terminal device to the control plane node based on the fifth message includes:

sending, by the gateway node, a sixth message to the control plane node based on the association parameter, where the sixth message carries an identity reply message, the identity reply message is used to respond to the identity request message, and the identity reply message carries the permanent identifier of the terminal device.

Optionally, the sending, by the gateway node, a fourth message to the terminal device based on the third message includes:

when the third message carries an extensible authentication protocol/identity-request EAP-AKA'/Identity-Request message and the extensible authentication protocol/identity-request EAP-AKA'/Identity-Request message is used to trigger an authentication procedure for the terminal device, sending, by the gateway node, the fourth message to the terminal device by using a first IPsec connection between the gateway node and the terminal device, where the fourth message carries the extensible authentication protocol/identity-request EAP-AKA'/Identity-Request message and a first failure cause value, where the first failure cause value is used to notify the terminal device that the first IPsec connection fails, the first failure cause value is further used to instruct the terminal device to send an association parameter to associate the first IPsec connection with a second IPsec connection, the association parameter is a parameter used to associate the first IPsec connection with the second IPsec connection, and the second IPsec connection is an IPsec connection established after the first IPsec connection is disconnected.

Optionally, the fifth message carries an extensible authentication protocol/identity-response EAP-AKA'/Identity-Response message and the association parameter, the EAP-AKA'/Identity-Response message is used to respond to the EAP-AKA'/Identity-Request message, and the EAP-AKA'/Identity-Response message carries the permanent identifier of the terminal device; and the sending, by the gateway node, the permanent identifier of the terminal device to the control plane node based on the fifth message includes:

sending, by the gateway node, a sixth message to the control plane node based on the association parameter, where the sixth message carries the EAP-AKA'/Identity-Response message.

In this embodiment of this application, after failing to obtain the context of the terminal device, the control plane node may directly trigger authentication. An authentication procedure is combined with a process of obtaining the permanent identifier of the terminal device, so that a quantity of times of signaling interaction is reduced.

Optionally, the sending, by the gateway node, a fourth message to the terminal device based on the third message includes:

when the third message carries a failure message and the failure message is used to indicate that the control plane node cannot determine the permanent identifier of the terminal device, sending, by the gateway node, the fourth message to the terminal device by using a first IPsec connection between the gateway node and the terminal device, where the fourth message carries the failure message and a second failure cause value, where the second failure cause value is used to notify the terminal device that the first IPsec connection fails.

Optionally, the sending, by the gateway node, a fourth message to the terminal device based on the third message includes:

when the third message carries a notification message and the notification message is used to notify the gateway node that the control plane node cannot determine the permanent identifier of the terminal device, sending, by the gateway node, the fourth message to the terminal device by using a first IPsec connection between the gateway node and the terminal device, where the fourth message carries a registration reject message and a second failure cause value, where the second failure cause value is used to notify the terminal device that the first IPsec connection fails.

Optionally, the fifth message carries a registration request message, and the registration request message carries the permanent identifier of the terminal device; and the sending, by the gateway node, the permanent identifier of the terminal device to the control plane node based on the fifth message includes:

sending, by the gateway node, a sixth message to the control plane node, where the sixth message carries the registration request message; or sending, by the gateway node, a sixth message to the control plane node, where the sixth message carries the registration request message and an EAP-AKA'/Identity-Response message, and the EAP-AKA'/Identity-Response message is used to trigger an authentication procedure for the terminal device.

In this embodiment of this application, the gateway node may send the registration request message and the EAP-AKA'/Identity-Response message together, and the control plane node may start to authenticate the terminal device when obtaining the permanent identifier of the terminal device, so that a quantity of times of signaling interaction is reduced.

According to a second aspect, a method for obtaining an identifier of a terminal device is provided. The method includes:

sending, by a terminal device, a first message to a gateway node, where the first message carries a temporary identifier of the terminal device:

receiving, by the terminal device, a fourth message sent by the gateway node, where the fourth message is used to respond to the first message; and sending, by the terminal device, a fifth message to the gateway node based on the fourth message, where the fifth message carries a permanent identifier of the terminal device.

In this embodiment of this application, when receiving the fourth message, the terminal device may reply to the gateway node with the fifth message that carries the permanent identifier, so that the gateway node sends the permanent identifier to the control plane node. In this way, it is possible that the terminal device successfully accesses a network.

Optionally, the sending, by the terminal device, a fifth message to the gateway node based on the fourth message includes:

when the fourth message carries an identity request message and the identity request message is used to request the permanent identifier of the terminal device, sending, by the terminal device, the fifth message to the gateway node, where the fifth message carries an identity reply message, the identity reply message is used to respond to the identity request message, and the identity reply message carries the permanent identifier of the terminal device; or when the fourth message carries an extensible authentication protocol/identity-request EAP-AKA'/Identity-Request message and the EAP-AKA'/Identity-Request message is used to trigger an authentication procedure for the terminal device, sending, by the terminal device, the fifth message to the gateway node, where the fifth message carries an extensible authentication protocol/identity-response EAP-AKA'/Identity-Response message, the extensible authentication protocol/identity EAP-AKA'/Identity-Response message is used to respond to the EAP-AKA'/Identity-Request message, and the EAP-AKA'/Identity-Response message carries the permanent identifier of the terminal device; or when the fourth message carries a failure message and the failure message is used to indicate that the control plane node cannot determine the permanent identifier of the terminal device, sending, by the terminal device, the fifth message to the gateway node, where the fifth message carries a registration request message, and the registration request message carries the permanent identifier of the terminal device.

Optionally, the fourth message further carries a first failure cause value, the first failure cause value is used to notify the terminal device that a first IPsec connection fails, the first failure cause value is further used to instruct the terminal device to send an association parameter to associate the first IPsec connection with a second IPsec connection, the association parameter is a parameter used to associate the first IPsec connection with the second IPsec connection, and the second IPsec connection is an IPsec connection established after the first IPsec connection is disconnected;

before the sending, by the terminal device, the fifth message to the gateway node, the method further includes:

ending, by the terminal device, the first IPsec connection between the terminal device and the gateway node, and establishing the second IPsec connection between the terminal device and the gateway node; and the sending, by the terminal device, the fifth message to the gateway node includes:

sending, by the terminal device, the fifth message to the gateway node by using the second IPsec connection, where the fifth message further carries the association parameter, and the association parameter is a parameter used to associate the first IPsec connection with the second IPsec connection.

Optionally, the association parameter is a globally unique temporary user equipment identity GUTI, a security parameter index SPI, or a Cookie.

Optionally, the sending, by the terminal device, a fifth message to the gateway node based on the fourth message includes:

when the fourth message carries a second failure cause value and a failure message, the second failure cause value is used to notify the terminal device that a first IPsec connection fails, and the failure message is used to notify the terminal device that the control plane node cannot determine the permanent identifier of the terminal device, ending, by the terminal device, the first IPsec connection between the terminal device and the gateway node, establishing a second IPsec connection to the gateway node, and sending the fifth message to the gateway node by using the second IPsec connection, where the fifth message carries a registration request message, and the registration request message carries the permanent identifier of the terminal device; or when the fourth message carries a second failure cause value and a registration reject message and the second failure cause value is used to notify the terminal device that a first IPsec connection fails, ending, by the terminal device, the first IPsec connection between the terminal device and the gateway node, establishing a second IPsec connection to the gateway node, and sending the fifth message to the gateway node by using the second IPsec connection, where the fifth message carries a registration request message, and the registration request message carries the permanent identifier of the terminal device.

According to a third aspect, a method for obtaining an identifier of a terminal device is provided. The method includes:

receiving, by a control plane node, a second message sent by a gateway node, where the second message carries a temporary identifier of a terminal device;

searching, by the control plane node, for a context of the terminal device based on the temporary identifier;

when obtaining no context of the terminal device, sending, by the control plane node, a third message to the gateway node; and receiving, by the control plane node, a permanent identifier of the terminal device that is sent by the gateway node.

In this embodiment of this application, when obtaining no context of the terminal device, the control plane node may send the third message to the gateway node, so that the gateway node requests the permanent identifier from the terminal device based on the third message. In this way, even if the control plane node obtains no context of the terminal device, the control plane node can obtain the permanent identifier of the terminal device through forwarding of the gateway node, so that it is possible that the terminal device successfully accesses a network.

According to a fourth aspect, an apparatus for obtaining an identifier of a terminal device is provided. The apparatus has a function of implementing behavior in the method for obtaining an identifier of a terminal device in the first aspect. The apparatus includes at least one module, and the at least one module is configured to implement the method for obtaining an identifier of a terminal device provided in the first aspect.

According to a fifth aspect, an apparatus for obtaining an identifier of a terminal device is provided. The apparatus has a function of implementing behavior in the method for obtaining an identifier of a terminal device in the second aspect. The apparatus includes at least one module, and the at least one module is configured to implement the method for obtaining an identifier of a terminal device provided in the second aspect.

According to a sixth aspect, an apparatus for obtaining an identifier of a terminal device is provided. The apparatus has a function of implementing behavior in the method for obtaining an identifier of a terminal device in the third aspect. The apparatus includes at least one module, and the at least one module is configured to implement the method for obtaining an identifier of a terminal device provided in the third aspect.

According to a seventh aspect, an apparatus for obtaining an identifier of a terminal device is provided. A structure of the apparatus includes a processor and a memory. The memory is configured to: store a program that supports the apparatus in performing the method for obtaining an identifier of a terminal device provided in the first aspect, and store data in the method for obtaining an identifier of a terminal device provided in the first aspect. The processor is configured to execute the program stored in the memory. The apparatus may further include a communications bus. The communications bus is configured to establish a connection between the processor and the memory.

According to an eighth aspect, an apparatus for obtaining an identifier of a terminal device is provided. A structure of the apparatus includes a processor and a memory. The memory is configured to: store a program that supports the apparatus in performing the method for obtaining an identifier of a terminal device provided in the second aspect, and store data in the method for obtaining an identifier of a terminal device provided in the second aspect. The processor is configured to execute the program stored in the memory. The apparatus may further include a communications bus. The communications bus is configured to establish a connection between the processor and the memory.

According to a ninth aspect, an apparatus for obtaining an identifier of a terminal device is provided. A structure of the apparatus includes a processor and a memory. The memory is configured to: store a program that supports the apparatus in performing the method for obtaining an identifier of a terminal device provided in the third aspect, and store data in the method for obtaining an identifier of a terminal device provided in the third aspect. The processor is configured to execute the program stored in the memory. The apparatus may further include a communications bus. The communications bus is configured to establish a connection between the processor and the memory.

According to a tenth aspect, a computer-readable storage medium is provided. The computer-readable storage medium stores an instruction. When the instruction runs on a computer, the computer performs the method for obtaining an identifier of a terminal device according to the first aspect.

According to an eleventh aspect, a computer-readable storage medium is provided. The computer-readable storage medium stores an instruction. When the instruction runs on a computer, the computer performs the method for obtaining an identifier of a terminal device according to the second aspect.

According to a twelfth aspect, a computer-readable storage medium is provided. The computer-readable storage medium stores an instruction. When the instruction runs on a computer, the computer performs the method for obtaining an identifier of a terminal device according to the third aspect.

According to a thirteenth aspect, a computer program product that includes an instruction is provided. When the instruction runs on a computer, the computer performs the method for obtaining an identifier of a terminal device according to the first aspect.

According to a fourteenth aspect, a computer program product that includes an instruction is provided. When the instruction runs on a computer, the computer performs the method for obtaining an identifier of a terminal device according to the second aspect.

According to a fifteenth aspect, a computer program product that includes an instruction is provided. When the instruction runs on a computer, the computer performs the method for obtaining an identifier of a terminal device according to the third aspect.

Technical effects obtained in the fourth aspect to the fifteenth aspect are similar to technical effects obtained by using corresponding technical means in the first aspect, the second aspect, and the third aspect. Details are not described herein again.

The technical solutions provided in this application bring at least the following beneficial effect: In the embodiments of this application, when the control plane node cannot obtain the context of the terminal device, the control plane node may send, to the gateway node, the third message used to request the permanent identifier of the terminal device, and then the gateway node may forward the third message to the terminal device, to return the obtained permanent identifier to the control plane node. Therefore, it can be learned that in the embodiments of this application, even if the control plane node obtains no context of the terminal device, the control plane node can obtain the permanent identifier of the terminal device through forwarding of the gateway node, so that it is possible that the terminal device successfully accesses a network. Compared with a prior-art access procedure in which access needs to be performed again once access fails, the method provided in the embodiments of this application makes an access procedure more convenient and more proper.

DESCRIPTION OF EMBODIMENTS

Figure 1:
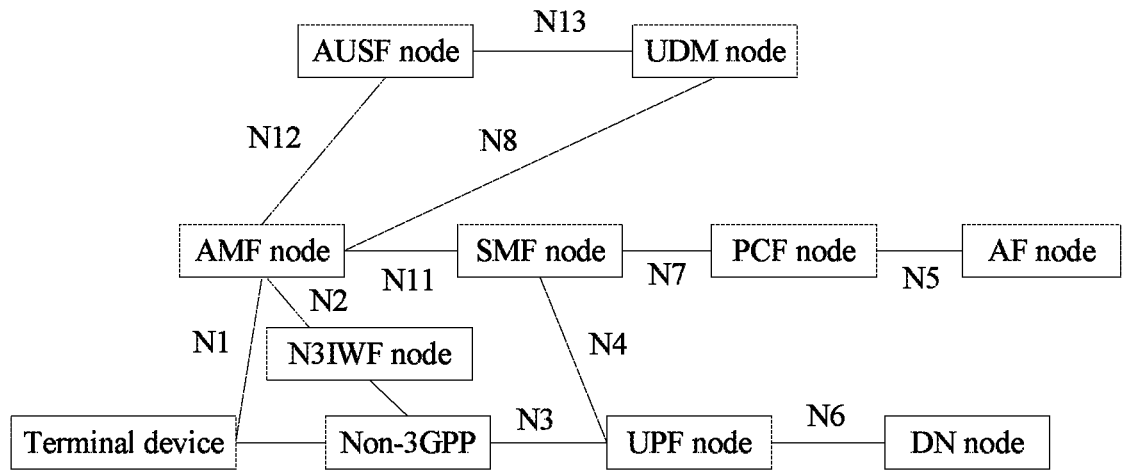
FIG. 1 is a structural diagram of a system according to an embodiment of this application.

To make the objectives, technical solutions, and advantages of this application clearer, the following further describes the implementations of this application in detail with reference to the accompanying drawings.

Before the embodiments of this application are described in detail, an application scenario of the embodiments of this application is described first.

Currently, a terminal device may access a network by using a 3GPP technology, or may access a network by using a non-3GPP technology. The 3GPP technology is an air interface technology formulated by using the 3GPP standard. For example, common air interface access technologies of 3G 4G and 5G networks are 3GPP technologies. The remaining air interface access technology that is not formulated by using the 3GPP standard is the non-3GPP technology. For example, an air interface technology represented by a wireless fidelity access point (WIFI AP) is a non-3GPP technology.

Currently, the non-3GPP technology may be further classified into a trusted non-3GPP technology and a non-trusted non-3GPP technology. The trusted non-3GPP technology means that a non-3GPP access node and a gateway node next to the non-3GPP access node are deployed by a same carrier. For example, in a system architecture shown in FIG. 1, if both a non-3GPP access node and an N3IWF node are deployed by a same carrier, the non-3GPP technology is a trusted non-3GPP technology. Any non-3GPP technology other than the trusted non-3GPP technology is a non-trusted non-3GPP technology. For example, if in the architecture shown in FIG. 1, the non-3GPP access node and the N3IWF node are not deployed by a same carrier, the non-3GPP technology is a non-trusted non-3GPP technology.

Regardless of whether the terminal device accesses the network by using the 3GPP technology or accesses the network by using the non-3GPP technology, the terminal device may be authenticated by using a control plane node. Specifically, when the terminal device is authenticated by using the control plane node, the control plane node needs to obtain a permanent identifier of the terminal device.

In the prior art, when the terminal device accesses the network by using the non-3GPP technology and the terminal device is registered again rather than registered for the first time, the terminal device may send, to the control plane node by using a gateway node, a registration request message that carries a temporary identifier, and integrity of the registration request message is protected. The control plane node may search for a context of the terminal device based on the temporary identifier. If the control plane node is a control plane node used when the terminal device is registered for the first time and the control plane node used when the terminal device is registered for the first time stores the context of the terminal device, the control plane node may verify the integrity of the registration request message based on the found context of the terminal device, so that the terminal device successfully accesses the network. However, if because the terminal device moves, the currently selected control plane node stores no context of the terminal device, in other words, the control plane node is not the control plane node used when the terminal device is registered for the first time, the control plane node cannot obtain the context of the terminal device, and apparently cannot obtain the permanent identifier of the terminal device. A method for obtaining an identifier of a terminal device provided in the embodiments of this application may be used in this scenario, to resolve the problem that the control plane node cannot obtain the permanent identifier of the terminal device when finding no context of the terminal device.

After the application scenario of the embodiments of this application is described, the following describes a system architecture of the embodiments of this application.

The method for obtaining an identifier of a terminal device provided in the embodiments of this application may be applied to any communications system in which an identifier of a terminal device needs to be obtained, for example, may be applied to a system shown in FIG. 1.

As shown in FIG. 1, the system may include a terminal device, a non-3rd generation partnership project (Non-3GPP) access node, an N3IWF node, a data network (DN) node, and the following plurality of network function (NF) nodes: an authentication server function (AUSF) node, a unified data management (UDM) node, an access and mobility management function (AMF) node, a session management function (SMF) node, a PCF node, an application function (AF) node, and a user plane function (UPF) node. It may be understood that FIG. 1 is merely an example architectural diagram. In addition to the function nodes shown in FIG. 1, the system may further include other function nodes. This is not limited in the embodiments of this application.

In the system shown in FIG. 1, connections may be established between the function nodes by using next generation (NG) network interfaces to implement communication. For example, the terminal device may establish a control plane signaling connection to the AMF node by using an N interface 1 (N1), an AN/RAN node may establish a user plane data connection to the UPF node by using an N interface 3 (N3), the N3IWF node may establish a control plane signaling connection to the AMF node by using an N interface 2 (N2), the UPF node may establish a control plane signaling connection to the SMF node by using an N interface 4 (N4), the UPF node may exchange user plane data with the DN node by using an N interface 6 (N6), the AMF node may establish a control plane signaling connection to the UDM node by using an N interface 8 (N8), the AMF node may establish a control plane signaling connection to the AUSF node by using an N interface 12 (N12), the AMF node may establish a control plane signaling connection to the SMF node by using an N interface 11 (N11), the SMF node may establish a control plane signaling connection to the PCF node by using an N interface 7 (N7), the PCF node may establish a control plane signaling connection to the AF node by using an N interface 5 (N5), and the AUSF node may establish a control plane signaling connection to the UDM node by using an N interface 13 (N13).

The terminal device in FIG. 1 may be UE, or may be a cellular phone, a cordless telephone set, a session initiation protocol (SIP) phone, a smartphone, a wireless local loop (WLL) station, a personal digital assistant (PDA), a laptop computer, a handheld communications device, a handheld computing device, a satellite radio device, a wireless modem card, and/or another device configured to perform communication in a wireless system. The non-3GPP node is a network including a plurality of nodes, and is configured to implement a radio physical layer function, a resource scheduling function, a radio resource management function, a radio access control function, a mobility management function, and the like. The UDM node, the AUSF node, the PCF node, the AMF node, the SMF node, and the UPF node may be collectively referred to as NF nodes. In the NF nodes, the AMF node and the PCF node may be referred to as control plane (CP) nodes, and the UPF node may be referred to as a user plane function (UPF) node. All the NF nodes except the UPF node may work independently, or may be combined to implement some control functions. For example, these nodes may be combined to complete an access control and mobility management function such as access authentication, security encryption, and location registration of the terminal device, a session management function such as establishment, releasing, and modification of a user plane transmission path, and a function of analyzing some slice-related data (for example, congestion) and terminal device-related data. The UPF node mainly completes a function such as routing and forwarding of user plane data, for example, is responsible for data packet filtering, data transmission/forwarding, rate control, charging information generation, and the like for the terminal device.

Specifically, the N3IWF node is a node to which the terminal device needs to be connected when the terminal device performs access by using a non-3GPP technology. In addition, the N3IWF node may establish an internet protocol security (IPsec) connection to the terminal device, and transmit signaling by using the IPsec connection. In addition, the N3IWF node may forward, to the AMF node, a NAS message sent by the terminal device. The AMF node is mainly responsible for mobility management. Currently, a security anchor function (SEAF) module is further integrated into the AMF node. The SEAF module is mainly responsible for initiating an authentication request to the AUSF node, to complete verification on the terminal device on a network side in an authentication process of an evolved packet system. The AUSF node is mainly configured to: receive the authentication request sent by the SEAF module, and select an authentication method. When an authentication method of an extensible authentication protocol is used, the AUSF node is mainly responsible for completing authentication on the terminal device on the network side. In addition, the AUSF node may request an authentication vector from an authentication credential repository and processing function (ARPF) node, and reply to the SEAF module with an authentication response. The ARPF node is mainly configured to: store a long-term key, receive an authentication vector request sent by the AUSF node, calculate an authentication vector by using the stored long-term key, and send the authentication vector to the AUSF node.

Figure 2A:
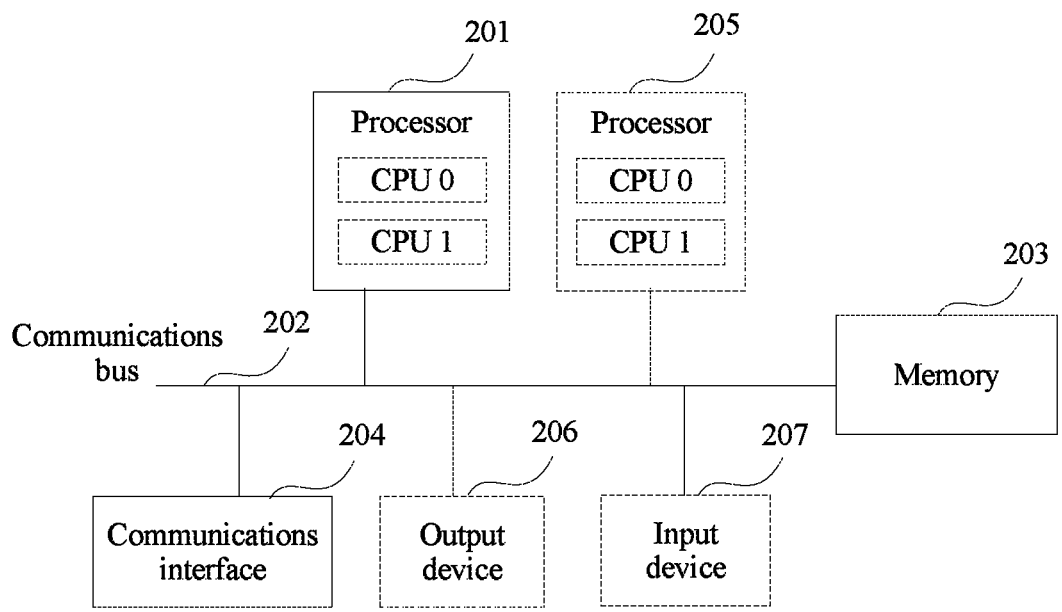
FIG. 2A is a schematic structural diagram of an apparatus according to an embodiment of this application.

Specifically, the AMF node, the UDM node, the AUSF node, the PCF node, the SMF node, and the UPF node in FIG. 1 may all be referred to as network function nodes, and each may specifically include components shown in FIG. 2A. FIG. 2A is a schematic structural diagram of an apparatus according to an embodiment of this application. The apparatus may be any network function node in FIG. 1. Referring to FIG. 2A, the apparatus includes at least one processor 201, a communications bus 202, a memory 203, and at least one communications interface 204. It should be noted that a device structure shown in FIG. 2A constitutes no limitation on the network function node, and the network function node may include more or fewer components than those shown in the figure, or have a combination of some components, or have a different component arrangement. This is not limited in this embodiment of this application. The following describes the components of the network function node in detail with reference to FIG. 2A.

The processor 201 is a control center of the apparatus, and may be one processor or may be a collective term of a plurality of processing elements. For example, the processor 201 may be a general-purpose central processing unit (CPU), an application-specific integrated circuit (ASIC), or one or more integrated circuits for controlling program execution in the solutions of this application, for example, one or more microprocessors (DSP), or one or more field programmable gate arrays (FPGA). The processor 201 may implement various functions of the network function node by running or executing a software program stored in the memory 203 and invoking data stored in the memory 203. For example, actions of a gateway node or a control plane node in an embodiment shown in FIG. 3 may be performed by a processor of a corresponding network function node by invoking data in a memory.

During specific implementation, in an embodiment, the processor 201 may include one or more CPUs, for example, a CPU 0 and a CPU 1 that are shown in FIG. 2A.

During specific implementation, in an embodiment, the network function node may include a plurality of processors, for example, the processor 201 and a processor 205 that are shown in FIG. 2A. Each of the processors may be a single-core (single-CPU) processor, or may be a multi-core (multi-CPU) processor. The processor herein may be one or more devices, circuits, and/or processing cores configured to process data (such as a computer program instruction).

The communications bus 202 may include a channel for transmitting information between the foregoing components. The communications bus 202 may be an industry standard architecture (ISA) bus, a peripheral component interconnect (PCI) bus, an extdisconnected industry standard architecture (EISA) bus, or the like. The bus may be classified as an address bus, a data bus, a control bus, or the like. For ease of representation, only one thick line is used to represent the bus in FIG. 2A, but this does not mean that there is only one bus or only one type of bus.

The memory 203 may be a read-only memory (ROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, and the like), a magnetic disk storage medium or another magnetic storage device, or any other medium capable of carrying or storing expected program code in a form of instructions or data structures and capable of being accessed by a computer. However, the memory 203 is not limited thereto. The memory 203 may exist independently, and be connected to the processor 201 by using the communications bus 202. Alternatively, the memory 203 may be integrated into the processor 201. The memory 203 is configured to store a software program for performing the solutions provided in the embodiments of this application, and the processor 201 controls execution of the software program.

The communications interface 204 is configured to communicate with another device or a communications network, for example, the Ethernet, a RAN, or a wireless local area network (wireless local area networks, WLAN). The communications interface 204 may include a receiving unit for implementing a receiving function and a sending unit for implementing a sending function.

During specific implementation, in an embodiment, the network function node may further include an output device 206 and an input device 207. The output device 206 communicates with the processor 201, and may display information in a plurality of manners. For example, the output device 206 may be a liquid crystal display (LCD), a light emitting diode (LED) display device, a cathode-ray tube (CRT) display device, or a projector. The input device 207 communicates with the processor 201, and may receive input from a user in a plurality of manners. For example, the input device 207 may be a mouse, a keyboard, a touchscreen device, or a sensing device.

The network function node may be a general-purpose computer device or a dedicated computer device. During specific implementation, the network function node may be a desktop computer, a portable computer, a network server, or the like.

Figure 2B:
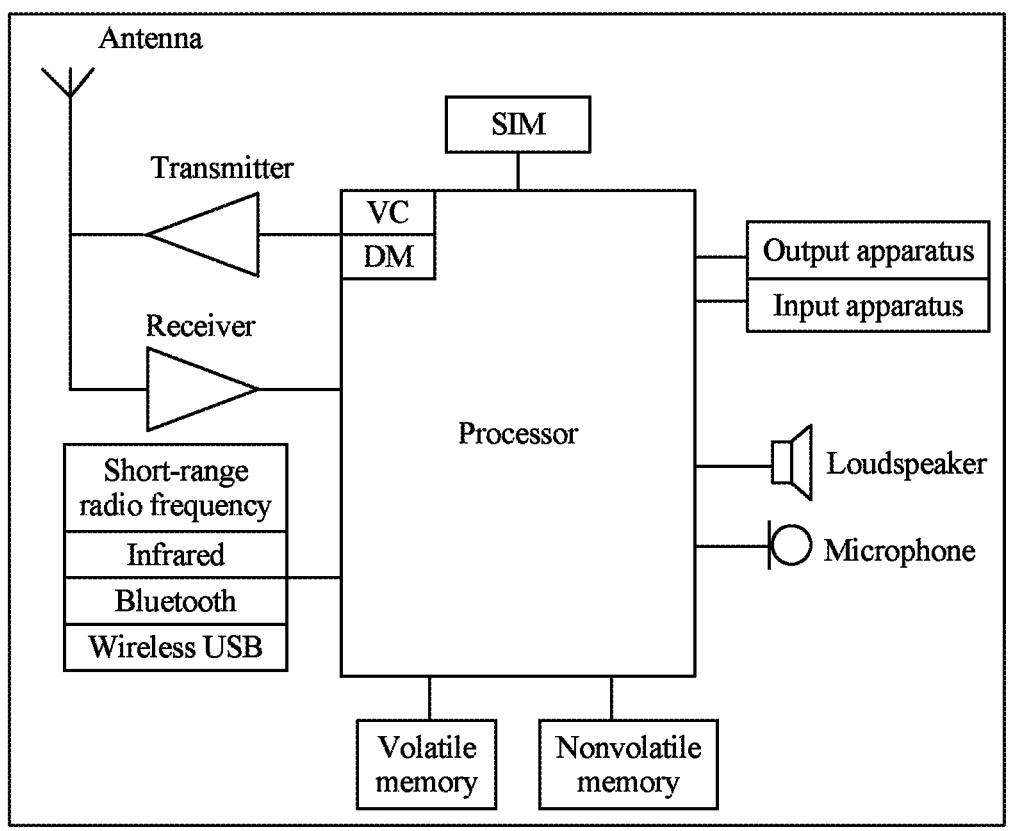
FIG. 2B is a schematic structural diagram of a terminal device according to an embodiment of this application.

Specifically, the terminal device in FIG. 1 may include components shown in FIG. 2B. FIG. 2B is a schematic structural diagram of a terminal device according to an embodiment of this application. The terminal device may be the terminal device in FIG. 1. Referring to FIG. 2B, the terminal device may include a processor, a user interface, one or more circuit connection modules, and a memory. It should be noted that a device structure shown in FIG. 2B constitutes no limitation on the terminal device, and the terminal device may include more or fewer components than those shown in the figure, or have a combination of some components, or have a different component arrangement. This is not limited in this embodiment of this application. The following describes the components of the terminal device in detail with reference to FIG. 2B.

The processor may include circuits used for audio/video and logical functions of the terminal device. For example, the processor may include a digital signal processor device, a microprocessor device, an analog-to-digital converter, and a digital-to-analog converter. Control and signal processing functions of the terminal device may be allocated to these devices based on respective capabilities of these devices. The processor may further include an internal voice coder VC, an internal data modem DM, and the like. In addition, the processor may include a function for operating one or more software programs, and the software programs may be stored in the memory. Usually, the processor and stored software instructions may be configured to enable the terminal device to perform actions. For example, the processor and the stored software instructions may be configured to perform actions performed by a terminal device in an embodiment shown in FIG. 3.

The terminal device may further include the user interface. The user interface may include, for example, a headset or a loudspeaker, a microphone, an output apparatus (for example, a display), and an input apparatus. The user interface is operably coupled to the processor. In this case, the processor may include a user interface circuit, and the user interface circuit is configured to control at least some functions of one or more elements (for example, the loudspeaker, the microphone, and the display) of the user interface. The processor and/or the user interface circuit included in the processor may be configured to control one or more functions of the one or more elements of the user interface by using a computer program instruction (for example, software and/or firmware) stored in the memory accessible to the processor. Although not shown, the terminal device may include a battery configured to supply power to various circuits related to the terminal device. The circuit is, for example, a circuit that provides mechanical vibration as detectable output. The input apparatus may include a device that allows the terminal device to receive data, such as a small keypad, a touch display, a joystick, at least one other input device, and/or the like.

The terminal device may further include the one or more circuit connection modules configured to share and/or obtain data. For example, the terminal device may include a short-range radio frequency RF transceiver and/or a detector, and therefore can share data with an electronic device and/or obtain data from the electronic device according to an RF technology. The terminal device may include other short-range transceivers, such as an infrared IR transceiver, a Bluetooth transceiver, and a wireless universal serial bus USB transceiver. The Bluetooth transceiver can be operated according to a low-power or ultra-low-power Bluetooth technology. In this case, the terminal device, more specifically, the short-range transceiver, can send data to and/or receive data from an electronic device near (for example, within 10 meters of) the apparatus. Although not shown, the terminal device can send data to and/or receive data from an electronic device according to various wireless networking technologies, and these technologies include: Wi-Fi, Wi-Fi low-power, and WLAN technologies such as an IEEE 802.11 technology, an IEEE 802.15 technology, and an IEEE 802.16 technology.

The terminal device may include the memory that can store an information element related to a mobile user, such as a subscriber identity module SIM. In addition to the SIM, the apparatus may further include another removable and/or fixed memory. The terminal device may include a volatile memory and/or a nonvolatile memory. For example, the volatile memory may include a random access memory RAM, and the RAM includes a dynamic RAM and/or a static RAM, and an on-chip and/or off-chip cache. The nonvolatile memory may be embedded and/or removable. The nonvolatile memory may include, for example, a read-only memory, a flash memory, a magnetic storage device such as a hard disk, a floppy disk drive, or a magnetic tape, an optical disc drive and/or medium, and a nonvolatile random access memory NVRAM. Similar to the volatile memory, the nonvolatile memory may include a cache area used to temporarily store data. At least a part of the volatile memory and/or the nonvolatile memory may be embedded into the processor. The memory may store one or more software programs, instructions, information blocks, data, and the like that may be used by the terminal device to perform a function of the mobile terminal. For example, the actions of the terminal device in the embodiment shown in FIG. 3 may be performed by a processor by invoking a software program, an instruction, an information block, data, and the like in a memory. Specifically, for example, the memory may include an identifier that can uniquely identify the terminal device, for example, an international mobile equipment identity IMEI, or may store an international mobile subscriber identity IMSI.

After the application scenario and the system architecture of the embodiments of this application are described, the following describes in detail a specific implementation process of the embodiments of this application.

Figure 3:
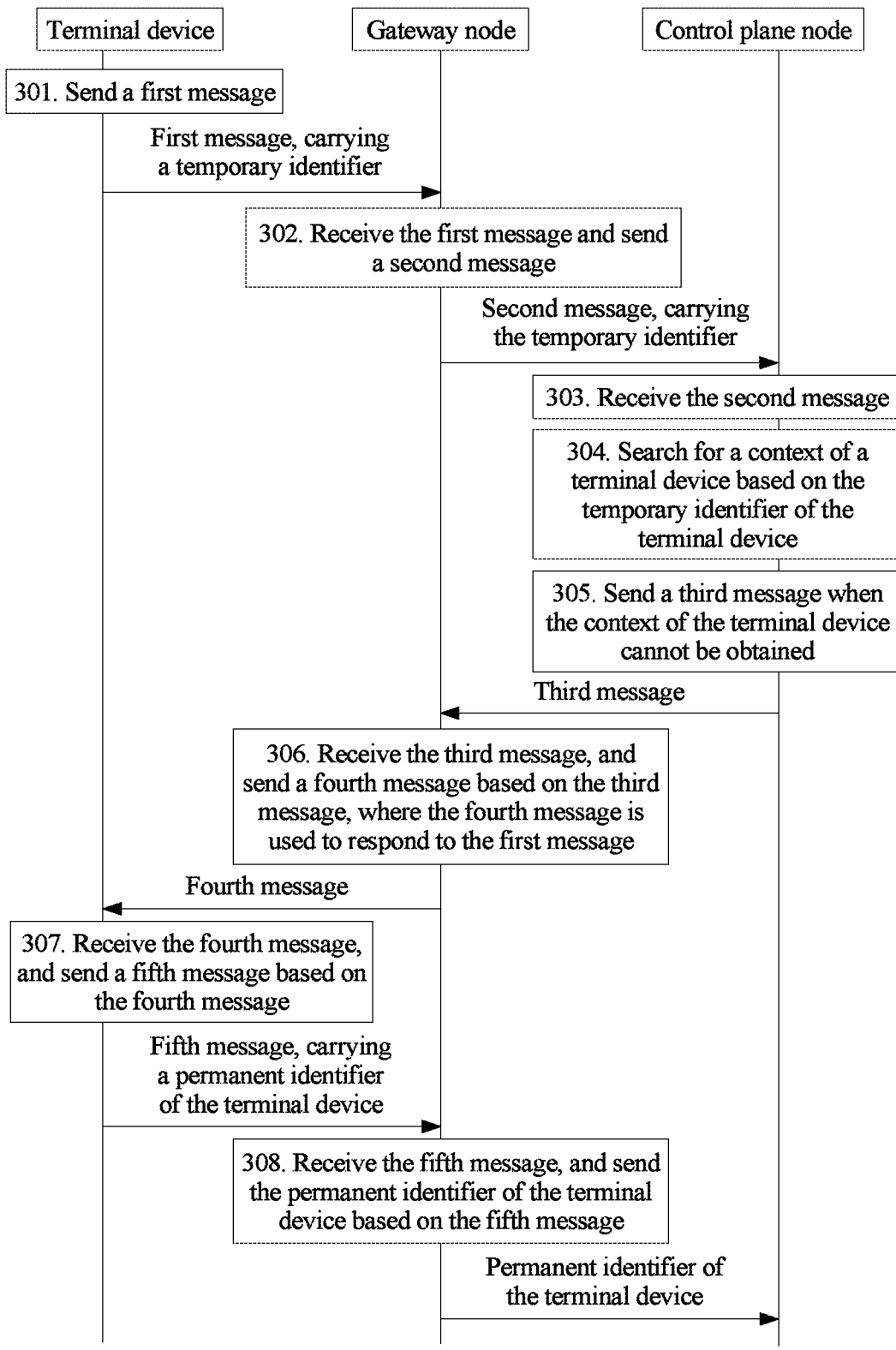
FIG. 3 is a flowchart of a method for obtaining an identifier of a terminal device according to an embodiment of this application.

FIG. 3 is a flowchart of a method for obtaining an identifier of a terminal device according to an embodiment of this application. Referring to FIG. 3, the method includes the following steps.

Step 301: A terminal device sends a first message to a gateway node, where the first message carries a temporary identifier of the terminal device.

The terminal device may be the terminal device in the system architecture shown in FIG. 1. The gateway node may be configured to: establish an IPsec tunnel connection to the terminal device, and forward, to a control plane node, a NAS message sent by the terminal device. The control plane node may be the AMF node shown in FIG. 1, an MME in an LTE system, or a network element or a function entity that is responsible for an access and mobility management in another 3GPP system.

Specifically, the gateway node may be the N3IWF node shown in FIG. 1.

It should be noted that the terminal device may be alternatively a terminal device applied to the LTE system or another 3GPP system, and likewise, the gateway node may be a gateway node applied to the LTE system and another 3GPP system. For example, the gateway node may be an ePDG node in an LTE network.

The first message may carry a request message, and the request message may be specifically a registration request message, a service request message, or a session establishment request message. The request message carries the temporary identifier of the terminal device.

The first message may be specifically an internet key exchange protocol version 2 (IKEv2) message. For example, the message is an internet key exchange protocol version 2-authentication-request (IKEv2-AUTH-Request) message. The temporary identifier of the terminal device may be used to identify the terminal device, and is allocated by an AMF or an MME to the terminal device when the terminal device accesses a network for the first time, to avoid privacy disclosure caused by excessive use of a permanent identifier of the terminal device. The temporary identifier may include address information of the control plane node that allocates the temporary identifier. The temporary identifier may be specifically, for example, a temporary identifier in a 5G system, a globally unique user equipment identity (GUTI) in the LTE system, or a system architecture evolution-temporary mobile subscriber identity (S-TMSI).

For example, when being registered with the network again, the terminal device sends the first message, where the first message carries a registration request message, and the registration request message carries the temporary identifier. For another example, when requesting the network to provide a service, the terminal device sends the first message, where the first message carries a service request message, and the service request message carries the temporary identifier, such as a GUTI or an S-TMSI. For another example, when requesting to establish a session, the terminal device sends the first message, where the first message carries a session establishment request message, and the session establishment request message carries the temporary identifier.

Optionally, before step 301, the method further includes that the terminal device negotiates with the gateway node to establish an IPsec connection.

Then, in step 301, the first message is sent by using the IPsec connection.

For example, when the terminal device accesses the network shown in FIG. 1 by using a non-3GPP technology, the gateway node and a non-3GPP access node such as a wifi AP are not deployed by a same carrier. In this case, for the gateway node, the non-3GPP access node is untrusted. Therefore, before the terminal device performs signaling interaction with the gateway node, the terminal device may negotiate with the gateway node to establish an IPsec connection. After establishing the IPsec connection, the terminal device may perform signaling interaction with the gateway node by using the IPsec connection, thereby protecting transmitted signaling.

Specifically, a detailed implementation process in which the terminal device sends the first message to the gateway node is described in detail in step 401 in the following embodiment.

Step 302: The gateway node receives the first message sent by the terminal device, and sends a second message to a control plane node, where the second message carries the temporary identifier of the terminal device.

The control plane node may be the AMF node shown in FIG. 1, an MME in the LTE system, or a network element or a function entity that is responsible for an access and mobility management in another 3GPP system.

For example, when receiving the first message sent by the terminal device, the gateway node may send, to the control plane node as a part or all of a message in the second message, the request message carried in the first message.

The second message may include the request message carried in the first message. For example, the second message may include a message such as the registration request message or the service request message.

Specifically, a detailed implementation process of this step is described in step 402 in the following embodiment.

Step 303: The control plane node receives the second message sent by the gateway node.

Step 304: The control plane node searches for a context of the terminal device based on the temporary identifier of the terminal device.

For example, when receiving the second message, the control plane node may determine a service requested by the terminal device, such as a registration service or a service request. In this case, the control plane node may search for the context of the terminal device based on the temporary identifier in the second message, to verify the terminal device and provide a service based on the context of the terminal device.

In an optional solution, the AMF node stores context information of the terminal device. Specifically, the AMF may obtain the context information of the terminal device based on the temporary identifier of the terminal device.

In another optional solution, the AMF node requests context information of the terminal device from another control plane node. Specifically, the AMF node may forward the request message to the another control plane node, and wait for the another control plane node to reply with a response message, where the response message may carry the context information of the terminal device. Further, the AMF node may determine the another control plane node based on the temporary identifier of the terminal device, to obtain the context of the terminal device from the another control plane node.

The context of the terminal device may include the permanent identifier of the terminal device.

Specifically, a detailed implementation process of this step is described in step 404 in the following embodiment.

Step 305: When the control plane node cannot obtain the context of the terminal device, the control plane node sends a third message to the gateway node.

The third message may be used to notify the terminal device that the control plane node cannot determine the permanent identifier of the terminal device. Alternatively, the third message may be used to request the permanent identifier from the terminal device, or used to notify the terminal device that the requested service fails, or used to notify the terminal device that the control plane node cannot obtain, cannot find, or does not store the permanent identifier of the terminal device.

Specifically, the third message may be an N2 message.

For example, when the control plane node obtains no context of the terminal device (for example, the control plane node does not store the context of the terminal device, or fails to request the context information of the terminal device from another control plane node), it indicates that the control plane node cannot determine a real identity of the terminal device, and therefore the control plane node cannot provide the requested service for the terminal device.

The third message may carry one or more of an identity request message, an extensible authentication protocol/identity-request (EAP-AKA'/Identity-Request) message, a failure message, or a notification message. The identity request message may be used to request the permanent identifier of the terminal device. The EAP-AKA'/Identity-Request message may be used to trigger an authentication procedure for the terminal device, to indirectly request the permanent identifier from the terminal device. The failure message may be used to notify the terminal device that the requested service fails.

Optionally, the failure message carries a cause value, and the terminal device may determine, by viewing the cause value carried in the failure message, a cause of the failure of the requested service. For example, the requested service may fail because a permanent identity of the terminal device cannot be determined.

Optionally, the notification message may be used to notify the gateway node that the control plane node cannot obtain the permanent identity of the terminal device. Specifically, the notification message may be further used to notify the gateway node of content of the third message sent by the control plane node or notify the gateway node of an action that should be taken. For example, when the control plane node can obtain the context of the terminal device, the notification message carries key information, and the gateway node authenticates the terminal device based on the carried key information; or when the control plane node cannot obtain the context of the terminal device, the notification message carries no key information and is used to notify the gateway node that the control plane node cannot authenticate the terminal device. For another example, the notification message may carry a cause value. Further, when receiving a message from the terminal device again, the gateway node may send the received message of the terminal device to the control plane node based on the carried cause value.

Optionally, when the third message is an N2 message, the identity request message, the EAP-AKA'/Identity-Request message, or the failure message may be placed in a NAS container in the N2 message.

Optionally, the notification message may be placed outside the NAS container of the N2 message.

Specifically, this step may include a plurality of possible implementations. The plurality of possible implementations are separately described in detail in step 405, step 505, step 605, and step 705 in the subsequent embodiments.

Step 306: The gateway node receives the third message sent by the control plane node, and sends a fourth message to the terminal device based on the third message, where the fourth message is used to respond to the first message.

For example, when receiving the third message sent by the control plane node, the gateway node sends the fourth message to the terminal device based on the third message, where the fourth message may be used to request the permanent identifier of the terminal device.

The fourth message may be an internet key exchange protocol version 2-authentication-response (IKEv2-AUTH-Response) message, and the IKEv2-AUTH-Response message is used to reply to the first message.

The fourth message may carry the identity request message and a first failure cause value, or may carry the EAP-AKA'/Identity-Request message and a first failure cause value, or may carry the failure message and a first failure cause value, or may carry the failure message and a second failure cause value, or may carry a registration reject message and a second failure cause value. The registration reject message may be a type of failure message.

It should be noted that the first failure cause value may be used to notify the terminal device that a first IPsec connection fails. Optionally, the first failure cause value may be further used by the terminal device to determine an association parameter based on the first cause value and send the association parameter to the gateway node. The gateway node associates the first IPsec connection with a second IPsec connection based on the association parameter. The second IPsec connection is a new IPsec connection established after the first IPsec connection is disconnected.

When the third message carries different content, the fourth message may also carry corresponding different content. Specifically, possible specific implementations of this step are separately described in detail in step 406, step 506, step 606, and step 706 in the following embodiments.

Step 307: The terminal device receives the fourth message sent by the gateway node, and sends a fifth message to the gateway node based on the fourth message, where the fifth message carries the permanent identifier of the terminal device.

The fifth message may be an IKEv2-AUTH-Request message, and may carry an identity reply message, where the identity reply message carries the permanent identifier of the terminal device. Alternatively, the fifth message may carry an extensible authentication protocol/identity-response (EAP-AKA'/Identity-Response) message, where the EAP-AKA'/Identity-Response message carries the permanent identifier of the terminal device. Alternatively, the fifth message may carry a registration request message, where the registration request message carries the permanent identifier of the terminal device.

Optionally, the fifth message may further carry the association parameter, and the association parameter is used to associate the first IPsec connection with the second IPsec connection, so that the gateway node may send, to the same control plane node, messages sent by using different IPsec connections. Specifically, the gateway node may determine, by using the association parameter, a specific control plane node to which a message that is in the fifth message and that carries the permanent identifier is to be sent. For example, the association parameter may be the temporary identifier previously added by the terminal device to the first message, or may be a security index parameter (SPI) or Cookies generated when the first IPsec connection is established. Optionally, the terminal device may place the temporary identifier in a network access identifier (NAI). The gateway node may send, to the control plane node based on information in the temporary identifier, the message that carries the permanent identifier.

The permanent identifier of the terminal device may be an international mobile subscriber identity (IMSI) of the terminal device, or may be a subscriber permanent identity (SUPI).

In this step, the fifth message may carry a plurality of types of possible content, and implementations corresponding to different carried content are separately described in detail in step 407, step 507, step 607, and step 707 in the subsequent embodiments.

Step 308: The gateway node receives the fifth message sent by the terminal device, and sends the permanent identifier of the terminal device to the control plane node based on the fifth message.

The gateway node may send the permanent identifier of the terminal device to the control plane node in different manners based on different content carried in the fifth message. Specific possible implementations are separately described in detail in step 408, step 508, step 608, and step 708 in the subsequent embodiments.

In this embodiment of this application, when the control plane node cannot obtain the context of the terminal device, the control plane node may send, to the gateway node, the third message that includes a message used to request the permanent identifier of the terminal device, and then the gateway node may forward, to the terminal device, the message that is included in the third message and that is used to request the permanent identifier of the terminal device, to return the obtained permanent identifier to the control plane node. Therefore, it can be learned that in this embodiment of this application, even if the control plane node obtains no context of the terminal device, the control plane node can obtain the permanent identifier of the terminal device through forwarding of the gateway node, so that it is possible that the terminal device successfully accesses a network. Compared with a prior-art access procedure in which access needs to be performed again once access fails, the method provided in this embodiment of this application makes an access procedure more convenient and more proper.

In a first possible implementation, when the third message carries the identity request message and the identity request message is used to request the permanent identifier of the terminal device, the gateway node sends the fourth message to the terminal device by using the first internet protocol security IPsec connection between the gateway node and the terminal device, where the fourth message carries the identity request message.

Optionally, the fourth message further carries the first failure cause value, the first failure cause value is used to notify the terminal device that the first IPsec connection fails, the first failure cause value is further used to associate the first IPsec connection with the second IPsec connection, and the second IPsec connection is an IPsec connection established after the first IPsec connection is disconnected.

Correspondingly, when the fourth message carries the identity request message and the identity request message is used to request the permanent identifier of the terminal device, the terminal device sends the fifth message to the gateway node, where the fifth message carries the identity reply message, the identity reply message is used to respond to the identity request message, and the identity reply message carries the permanent identifier of the terminal device.

Correspondingly, when the fourth message further carries the first failure cause value, before the terminal device sends the fifth message to the gateway node, the terminal device ends the first IPsec connection between the terminal device and the gateway node, and establishes the second IPsec connection between the terminal device and the gateway node.

The terminal device sends the fifth message to the gateway node by using the second IPsec connection, where the fifth message further carries the association parameter, and the association parameter is a parameter used to associate the first IPsec connection with the second IPsec connection.

Correspondingly, when the fifth message carries the identity reply message and the association parameter, the gateway node sends a sixth message to the control plane node indicated by the association parameter, where the sixth message carries the identity reply message and an extensible authentication protocol/identity-response EAP-AKA'/Identity-Response message, and both the identity reply message and the EAP-AKA'/Identity-Response message carry the permanent identifier; or the sixth message carries the identity reply message, the identity reply message carries the EAP-AKA'/Identity-Response message, and the EAP-AKA'/Identity-Response message carries the permanent identifier.

Alternatively, when the fifth message carries the identity reply message and the association parameter, the gateway node sends a sixth message to the control plane node based on the association parameter, where the sixth message carries the identity reply message, and the identity reply message carries the permanent identifier of the terminal device.

In this implementation, the gateway node may directly send, to the terminal device, the fourth message that carries the identity request message, to request the permanent identifier from the terminal device. In this way, after receiving the permanent identifier sent by the terminal device, the gateway node may send the permanent identifier to the control plane node. In other words, the control plane node may obtain the permanent identifier through forwarding of the gateway node. In addition, the fourth message may further carry the first failure cause value, so that the terminal device may carry the association parameter, and then the gateway node may send the permanent identifier to the terminal device indicated by the association parameter.

In a second possible implementation, when the third message carries the identity request message and the identity request message is used to request the permanent identifier of the terminal device, the gateway node sends the fourth message to the terminal device by using the first IPsec connection between the gateway node and the terminal device, where the fourth message carries the extensible authentication protocol/identity-request EAP-AKA'/Identity-Request message and the first failure cause value.

The EAP-AKA'/Identity-Request message is used to trigger an authentication procedure for the terminal device. The first failure cause value is used to notify the terminal device that the first IPsec connection fails. The first failure cause value is further used by the terminal device to determine the association parameter and send the association parameter to the gateway node. The gateway node associates the first IPsec connection with the second IPsec connection based on the association parameter. The second IPsec connection is an IPsec connection established again after the first IPsec connection is disconnected.

Correspondingly, when the fourth message carries the EAP-AKA'/Identity-Request message and the EAP-AKA'/Identity-Request message is used to trigger an authentication procedure for the terminal device, the terminal device sends the fifth message to the gateway node, where the fifth message carries the EAP-AKA'/Identity-Response message, the extensible authentication protocol/identity EAP-AKA'/Identity-Response message is used to respond to the EAP-AKA'/Identity-Request message, and the EAP-AKA'/Identity-Response message carries the permanent identifier of the terminal device.

Correspondingly, when the fourth message further carries the first failure cause value, before the terminal device sends the fifth message to the gateway node, the terminal device ends the first IPsec connection between the terminal device and the gateway node, and establishes the second IPsec connection between the terminal device and the gateway node.

Then, the terminal device sends the fifth message to the gateway node by using the second IPsec connection, where the fifth message further carries the association parameter, and the association parameter is a parameter used to associate the first IPsec connection with the second IPsec connection.

Correspondingly, when the fifth message carries the EAP-AKA'/Identity-Response message and the association parameter, the gateway node sends a sixth message to the control plane node based on the association parameter.

The sixth message carries an identity reply message and the EAP-AKA'/Identity-Response message, the identity reply message is used to respond to the identity request message, and the identity reply message carries the permanent identifier of the terminal device; or the sixth message carries the identity reply message, the identity reply message carries the EAP-AKA'/Identity-Response message, and the EAP-AKA'/Identity-Response message carries the permanent identifier of the terminal device.

In this implementation, the gateway node may generate the EAP-AKA'/Identity-Request message based on the identity request message, to request the permanent identifier from the terminal device. In other words, the gateway node may request the permanent identifier from the terminal device when triggering authentication. A process of triggering authentication is combined with a process of obtaining the permanent identifier, so that a quantity of times of signaling interaction is reduced.

In a third possible implementation, when the third message carries the identity request message and the identity request message is used to request the permanent identifier of the terminal device, the gateway node sends the fourth message to the terminal device by using the first IPsec connection between the gateway node and the terminal device, where the fourth message carries the failure message.

The failure message is used to indicate that the context of the terminal device fails to be obtained, the first failure cause value is used to notify the terminal device that the first IPsec connection fails, the first failure cause value is further used to associate the first IPsec connection with the second IPsec connection, and the second IPsec connection is an IPsec connection established after the first IPsec connection is disconnected.

Optionally, the fourth message further carries the first failure cause value, the first failure cause value is used to notify the terminal device that the first IPsec connection fails, the first failure cause value is further used to associate the first IPsec connection with the second IPsec connection, and the second IPsec connection is an IPsec connection established after the first IPsec connection is disconnected.

Correspondingly, when the fourth message further carries the first failure cause value, before the terminal device sends the fifth message to the gateway node, the terminal device ends the first IPsec connection between the terminal device and the gateway node, and establishes the second IPsec connection between the terminal device and the gateway node.

The terminal device may send the fifth message to the gateway node by using the second IPsec connection, where the fifth message further carries the association parameter, and the association parameter is a parameter used to associate the first IPsec connection with the second IPsec connection.

Correspondingly, when the fifth message carries the failure message and the association parameter, the gateway node sends a sixth message to the control plane node based on the association parameter, where the sixth message carries an identity reply message, the identity reply message is used to respond to the identity request message, and the identity reply message carries the permanent identifier of the terminal device.

In a fourth possible implementation, when the third message carries the EAP-AKA'/Identity-Request message and the EAP-AKA'/Identity-Request message is used to trigger an authentication procedure for the terminal device, the gateway node sends the fourth message to the terminal device by using the first IPsec connection between the gateway node and the terminal device, where the fourth message carries the extensible authentication protocol/identity-request EAP-AKA'/Identity-Request message.

Optionally, the fourth message further carries the first failure cause value, the first failure cause value is used to notify the terminal device that the first IPsec connection fails, the first failure cause value is further used by the terminal device to determine the association parameter and send the association parameter to the gateway node, the gateway node associates the first IPsec connection with the second IPsec connection based on the association parameter, and the second IPsec connection is an IPsec connection established after the first IPsec connection is disconnected.

Correspondingly, when the fourth message carries the EAP-AKA'/Identity-Request message and the EAP-AKA'/Identity-Request message is used to trigger an authentication procedure for the terminal device, the terminal device sends the fifth message to the gateway node, where the fifth message carries the EAP-AKA'/Identity-Response message, the EAP-AKA'/Identity-Response is used to respond to the EAP-AKA'/Identity-Request message, and the EAP-AKA'/Identity-Response message carries the permanent identifier of the terminal device.

When the fourth message further carries the first failure cause value, before the terminal device sends the fifth message to the gateway node, the terminal device ends the first IPsec connection between the terminal device and the gateway node, and establishes the second IPsec connection between the terminal device and the gateway node; and the terminal device sends the fifth message to the gateway node by using the second IPsec connection, where the fifth message further carries the association parameter, and the association parameter is a parameter used to associate the first IPsec connection with the second IPsec connection.

Correspondingly, when the fifth message carries the EAP-AKA'/Identity-Response message and the association parameter, the gateway node sends a sixth message to the control plane node based on the association parameter, where the sixth message carries the EAP-AKA'/Identity-Response message.

In this implementation, after failing to obtain the context of the terminal device, the control plane node directly triggers authentication. An authentication procedure is combined with a process of obtaining the permanent identifier of the terminal device, so that a quantity of times of signaling interaction is reduced.

In a fifth possible implementation, when the third message carries the failure message and the failure message is used to indicate that the control plane node cannot determine the permanent identifier of the terminal device, the gateway node sends the fourth message to the terminal device by using the first IPsec connection between the gateway node and the terminal device, where the fourth message carries the failure message.

The fourth message further carries the second failure cause value, and the second failure cause value is used to notify the terminal device that the first IPsec connection fails.

Correspondingly, when the fourth message carries the failure message and the failure message is used to indicate that the control plane node cannot determine the permanent identifier of the terminal device, the terminal device sends the fifth message to the gateway node, where the fifth message carries the registration request message, and the registration request message carries the permanent identifier of the terminal device.

When the fourth message further carries the second failure cause value, the terminal device ends the first IPsec connection between the terminal device and the gateway node, establishes the second IPsec connection to the gateway node, and sends the fifth message to the gateway node by using the second IPsec connection, where the fifth message carries the registration request message, and the registration request message carries the permanent identifier of the terminal device.

Correspondingly, when the fifth message carries the registration request message, the gateway node sends a sixth message to the control plane node, where the sixth message carries the registration request message; or the gateway node sends a sixth message to the control plane node, where the sixth message carries the registration request message and an EAP-AKA'/Identity-Response message, and the EAP-AKA'/Identity-Response message is used to trigger an authentication procedure for the terminal device.

In this implementation, the gateway node may send the registration request message and the EAP-AKA'/Identity-Response message together, and the control plane node may start to authenticate the terminal device when obtaining the permanent identifier of the terminal device, so that a quantity of times of signaling interaction is reduced.

In a sixth possible implementation, when the third message carries the notification message and the notification message is used to notify the gateway node that the control plane node cannot obtain the permanent identifier of the terminal device, the gateway node sends the fourth message to the terminal device by using the first IPsec connection between the gateway node and the terminal device, where the fourth message carries the registration reject message.

The fourth message further carries the second failure cause value, and the second failure cause value is used to notify the terminal device that the first IPsec connection fails.

Correspondingly, when the fourth message carries the registration reject message, the terminal device sends the fifth message to the gateway node, where the fifth message carries the registration request message, and the registration request message carries the permanent identifier of the terminal device.

When the fourth message further carries the second failure cause value, the terminal device ends the first IPsec connection between the terminal device and the gateway node, establishes the second IPsec connection to the gateway node, and sends the fifth message to the gateway node by using the second IPsec connection, where the fifth message carries the registration request message, and the registration request message carries the permanent identifier of the terminal device.

Correspondingly, when the fifth message carries the registration request message, the gateway node sends a sixth message to the control plane node, where the sixth message carries the registration request message; or the gateway node sends a sixth message to the control plane node, where the sixth message carries the registration request message and an EAP-AKA'/Identity-Response message, and the EAP-AKA'/Identity-Response message is used to trigger an authentication procedure for the terminal device.

In this embodiment of this application, when the control plane node cannot obtain the context of the terminal device, the control plane node may send the third message to the gateway node, where the third message may carry different types of messages to request the permanent identifier of the terminal device. Based on different messages carried in the third message, the gateway node and the terminal device perform different operations, in other words, the control plane node obtains the permanent identifier in different manners. The following separately describes this embodiment of this application in detail in different cases. First, a specific implementation process in which the control plane node obtains the identifier of the terminal device when the third message carries the identity request message is described with reference to FIG. 4A and FIG. 4B.

Figure 4A:
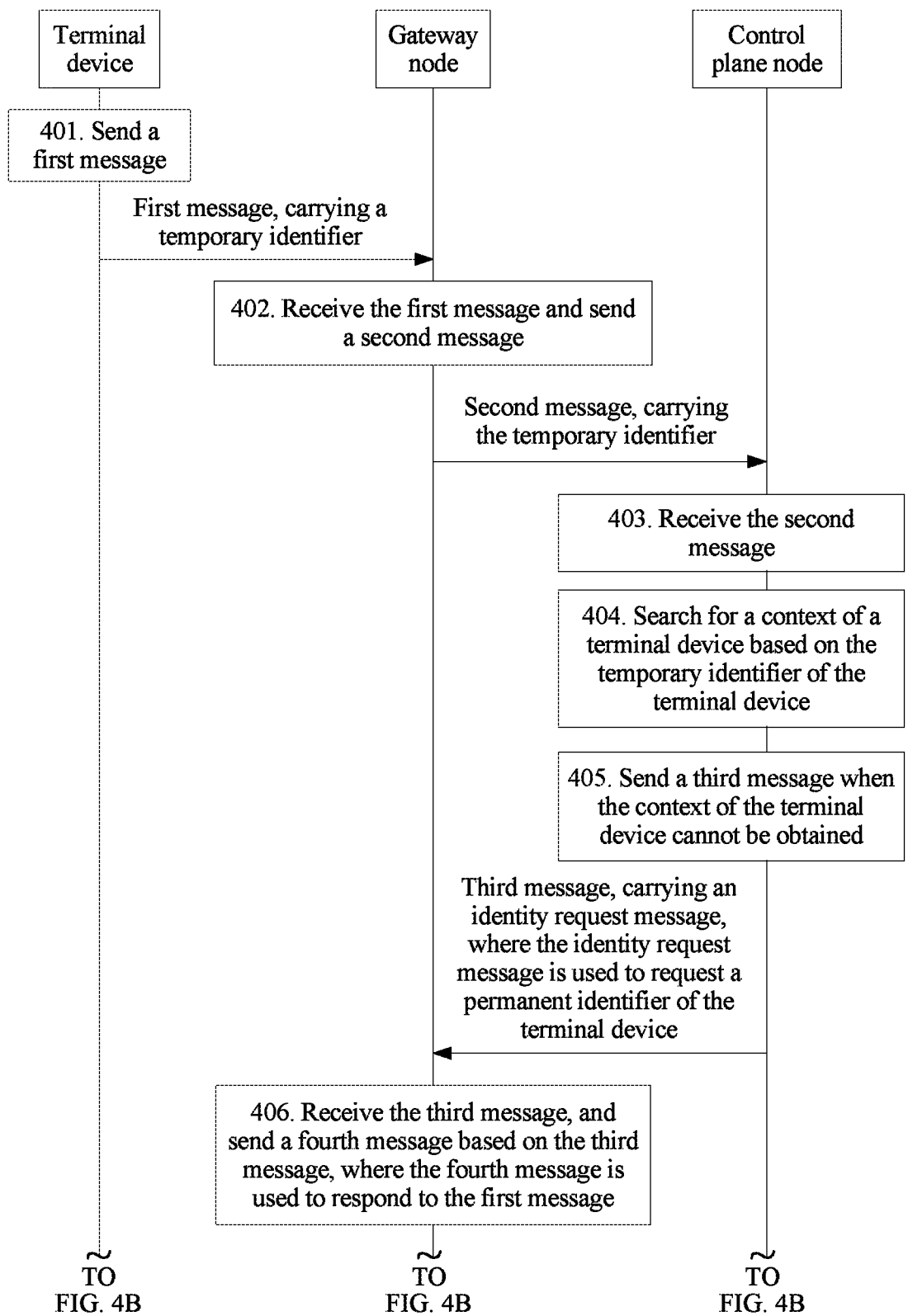
FIG. 4A and FIG. 4B are a flowchart of a method for obtaining an identifier of a terminal device according to an embodiment of this application.
Figure 4B:
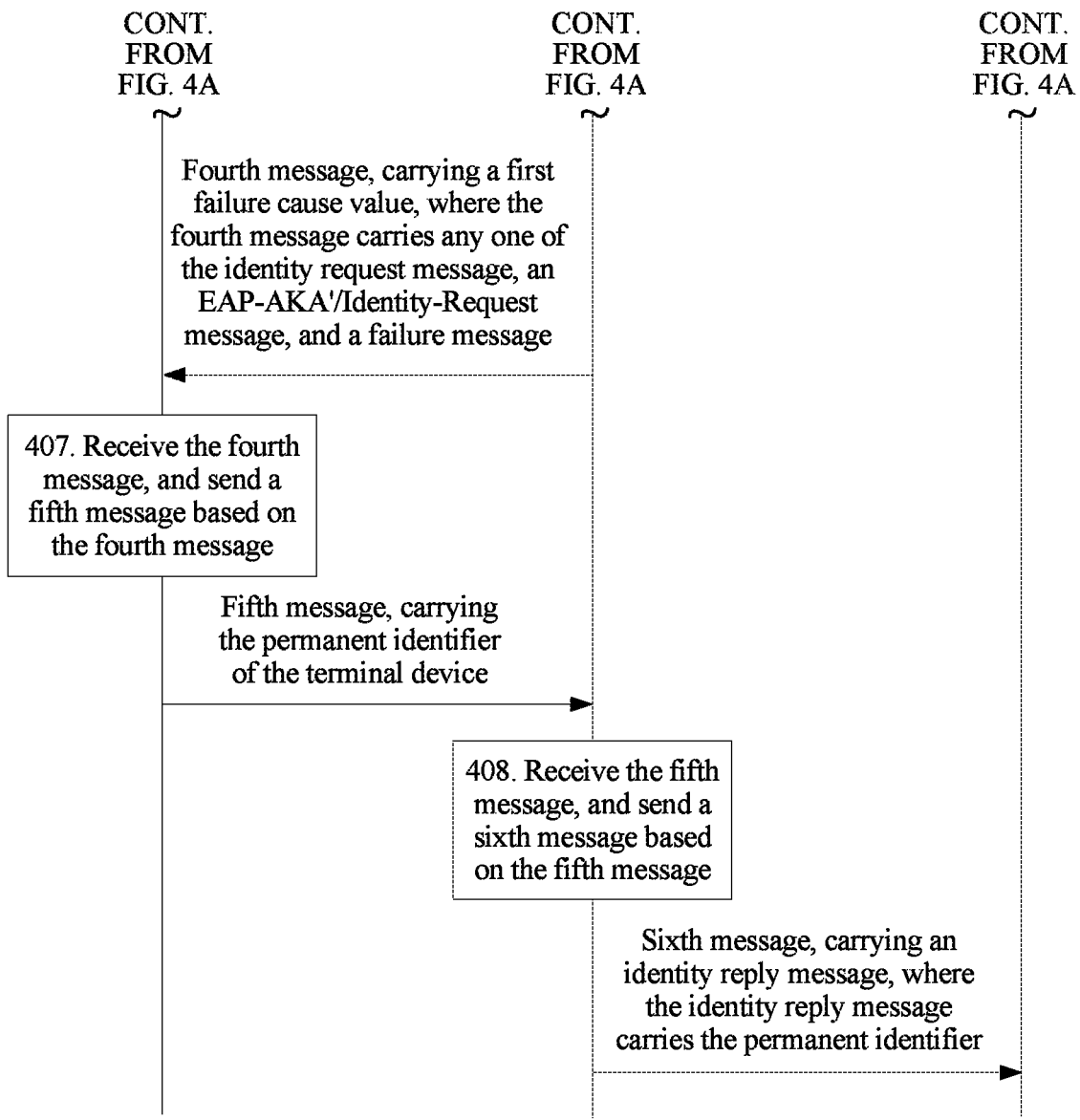

FIG. 4A and FIG. 4B are a flowchart of a method for obtaining an identifier of a terminal device according to an embodiment of this application. As shown in FIG. 4A and FIG. 4B, the method includes the following steps.

Step 401: A terminal device sends a first message to a gateway node, where the first message carries a temporary identifier of the terminal device.

When accessing a network, the terminal device may be registered with the network again, or request a service, or establish a session with the network. In this case, the terminal device may send, to the gateway node, a first message that carries a corresponding request message. For example, the terminal device may send, to the gateway node, a first message that carries a registration request message, or a first message that carries a service request message or a session establishment request message. All the request messages may carry the temporary identifier of the terminal device.

Optionally, when the terminal device accesses the network shown in FIG. 1 by using a non-3GPP technology, the gateway node and a non-3GPP access node such as a wifi AP are not deployed by a same carrier. In this case, for the gateway node, the non-3GPP access node is untrusted. Therefore, before the terminal device performs signaling interaction with the gateway node, the terminal device may negotiate with the gateway node to establish an IPsec connection. After establishing the IPsec connection, the terminal device may perform signaling interaction with the gateway node by using the IPsec connection, thereby protecting transmitted signaling.

When the terminal device sends the first message by using the first IPsec connection, the first message may be an IKEv2-AUTH-Request message.

When the first message is the IKEv2-AUTH-Request message, the first message includes a vendor identification (VID) payload, and the request message may be placed in the VID payload. In addition, in this embodiment of this application, the VID payload may be used to carry a non-access stratum (NAS) message. In addition to the temporary identifier of the terminal device, the request message in the VID payload may further carry a key identifier, a message authentication code (MAC), and the like. Because the gateway node may unnecessarily parse the NAS message in the VID payload, in order that the gateway node can select a suitable control plane node based on the temporary identifier of the terminal device, specifically, in addition to the VID payload, the first message may further carry an NAI, and the NAI may carry the temporary identifier of the terminal device. Optionally, when the first message is the IKEv2-AUTH-Request message, the first message may further carry an authentication payload, a notification payload, and/or the like.

It should be noted that in this embodiment of this application, the gateway node may determine, by checking whether there is an authentication payload in the first message, whether to trigger authentication. In addition, the authentication payload may be further used by the gateway node to verify the terminal device.

Step 402: The gateway node receives the first message sent by the terminal device, and sends a second message to a control plane node, where the second message carries the temporary identifier of the terminal device.

After receiving the first message sent by the terminal device, the gateway node may send the second message to the control plane node. The second message includes the NAS message in the VID payload in the first message, in other words, the second message may include one of the foregoing types of request messages.

For example, the VID payload in the first message carries the registration request message, and when receiving the first message, the gateway node sends the registration request message in the VID payload to the control plane node as a part or all of content in the second message.

Optionally, when the first message carries the authentication payload, the gateway node may not initiate an authentication procedure.

Step 403: The control plane node receives the second message sent by the gateway node.

Step 404: The control plane node searches for a context of the terminal device based on the temporary identifier.

After receiving the second message, the control plane node parses the second message, and then searches for the context of the terminal device based on the temporary identifier in the second message.

In an optional solution, the control plane node such as an AMF node may store the context of the terminal device. Specifically, the control plane node may determine the context of the terminal device based on the temporary identifier of the terminal device.

In another optional solution, the current control plane node may request the context of the terminal device from another control plane node. Specifically, the control plane node may forward the second message to the another control plane node, and wait for the another control plane node to reply with a response message, where the response message may carry context information of the terminal device. Further, the control plane node may determine, based on the temporary identifier of the terminal device, the another control plane node from which the control plane node needs to request the context.

Step 405: When the control plane node cannot obtain the context of the terminal device, the control plane node sends a third message to the gateway node, where the third message carries an identity request message, and the identity request message is used to request a permanent identifier of the terminal device.

In this embodiment of this application, the control plane node usually may process the second message. For example, the control plane node may verify integrity of the second message. If the verification succeeds, it indicates that the control plane node can obtain the permanent identifier of the terminal device. When the control plane node cannot find the permanent identifier of the terminal device or an integrity protection verification key in storage of the control plane node, or when the control plane node cannot obtain the permanent identifier of the terminal device from another control plane node, it may be determined that the control plane node cannot obtain the context of the terminal device.

When the control plane node determines that the control plane node cannot obtain the context of the terminal device, it indicates that the control plane node cannot determine the permanent identifier of the terminal device. In this case, the control plane node may send the third message to the gateway node, where the third message carries the identity request message, so that the control plane node requests the permanent identifier of the terminal device by using the identity request message.

Step 406: The gateway node receives the third message sent by the control plane node, and sends a fourth message to the terminal device based on the third message, where the fourth message is used to respond to the first message, the fourth message carries a first failure cause value, and the fourth message carries any one of the identity request message, an EAP-AKA'/Identity-Request message, and a failure message.

After the gateway node receives the third message, the gateway node requests the permanent identifier from the terminal device. The gateway node may communicate with the terminal device by using the established first IPsec connection, and the first message sent by the terminal device may be the IKEv2-AUTH-Request message. In this case, when sending a message to the terminal device, the gateway node may send an IKEv2-AUTH-Response message, namely, the fourth message. Specifically, content carried in the fourth message may be described in the following three cases:

(1) The fourth message carries the first failure cause value and the identity request message.

After the pair of messages are transmitted between the terminal device and the gateway node, the terminal device or the gateway node may end the first IPsec connection, and the terminal device initiates a request for establishing a second IPsec connection, in other words, further establishes the second IPsec connection to transmit a message. However, if the first IPsec connection is disconnected, the gateway node deletes the various types of previous information about the terminal device. In this case, when the terminal device sends the permanent identifier to the gateway node in the following step, the gateway node cannot determine whether the received permanent identifier is the permanent identifier of the terminal device that sends the first message. In this case, the gateway node cannot reply to the identity request message sent by the control plane node to the gateway node, in other words, cannot reply to the control plane node with the permanent identifier. Therefore, the gateway node may add the first failure cause value to the fourth message, and the terminal device may determine, based on the first failure cause value, that the gateway node needs to associate the two IPsec connections, so that the gateway node may determine that both messages received from terminal devices at two times belong to the same terminal device.

It should be noted that the first failure cause value may be a cause value pre-negotiated by the terminal device and the gateway node. Specifically, the first failure cause value may be pre-negotiated by using a message, may be configured by using a network management system, or may be preconfigured during factory setting. When the gateway node determines that the received third message carries the identity request message, the gateway node may reply to the control plane node with the identity request message. In this case, the gateway node may associate the two IPsec connections. In this case, the gateway node may add the first failure cause value to the fourth message, so that the terminal device carries an association parameter, and then the gateway node may associate the two IPsec connections based on the association parameter.

Specifically, in this embodiment of this application, the first failure cause value may be used to notify the terminal device of a cause of a failure of the first IPsec connection. Optionally, the first failure cause value may be further used to instruct the terminal device to send the association parameter, so that the gateway node may associate the two IPsec connections based on the association parameter. A specific association parameter that needs to be used during association is pre-negotiated by the terminal device and the gateway node. Specifically, the association parameter may be pre-negotiated by using a message, may be configured by using a network management system, or may be preconfigured during factory setting. For example, the association parameter may be a security parameter index (SPI) or Cookies generated during IPsec connection establishment, or the temporary identifier of the terminal device, such as a globally unique temporary user equipment identity (GUTI). When the association parameter is any one of the foregoing parameters, when ending the first IPsec connection, the gateway node needs to retain the corresponding parameter when deleting some information about the terminal device. For example, it is assumed that the association parameter is the SPI. In this case, the gateway node needs to retain the SPI when ending the IPsec connection to the terminal device, and the terminal device carries the SPI when establishing the second IPsec connection or after establishing the second IPsec connection.

In addition, the gateway node requests the permanent identifier from the terminal device by using the fourth message, where the fourth message may directly carry the identity request message received by the gateway node. Specifically, because the fourth message is a response message of the first message, when the first message is the IKEv2-AUTH-Request message, the fourth message may be the IKEv2-AUTH-Response message. In addition, the identity request message may be a NAS message and be carried in a VID payload in the fourth message. It should be further noted that the first failure cause value may be carried in an authentication payload or a notification payload in the fourth message or may be carried in another payload.

(2) The fourth message carries the first failure cause value and the EAP-AKA'/Identity-Request message.

When the gateway node receives the identity request message, the gateway node may determine that the control plane node requests the permanent identifier of the terminal device. In this case, the gateway node may request the permanent identifier from the terminal device by triggering authentication. Specifically, the gateway node may generate the EAP-AKA'/Identity-Request message, where the EAP-AKA'/Identity-Request message is used to trigger an authentication procedure for the terminal device. Then, the gateway node may add the EAP-AKA'/Identity-Request message to the fourth message.

Likewise, the fourth message may be the IKEv2-AUTH-response message, the EAP-AKA'/Identity-Request message may be a NAS message and be carried in a VID payload in the fourth message, and the first failure cause value may be carried in an authentication payload or a notification payload in the fourth message or may be carried in another payload.

(3) The fourth message carries the first failure cause value and the failure message.

When the gateway node receives the identity request message, the gateway node may determine that the control plane node requests the permanent identifier of the terminal device. In other words, the gateway node may consider that the control plane node fails to obtain the context of the terminal device. In this case, the gateway node may generate the failure message, where the failure message may be used to indicate that the control plane node cannot determine the permanent identifier of the terminal device. In this case, the gateway node may add the failure message to the fourth message, to notify the terminal device that the control plane node fails to obtain the context and therefore requests the permanent identifier of the terminal device.

It should be noted that the fourth message may be the IKEv2-AUTH-Response message, the failure message may be carried in a VID payload in the fourth message, and the first failure cause value may be carried in an authentication payload or a notification payload in the fourth message or may be carried in another payload.

Optionally, the failure message may be one of a registration failure message, a service request failure message, an integrity protection verification failure message, a session establishment failure message, or the like.

Step 407: The terminal device receives the fourth message sent by the gateway node, and sends a fifth message to the gateway node based on the fourth message, where the fifth message carries the permanent identifier of the terminal device.

When receiving the fourth message sent by the gateway node, the terminal device may process the fourth message. It can be learned from step 406 that the content carried in the fourth message may be classified into three types. The terminal device may perform different processing based on different content carried in the fourth message.

(1) When the fourth message carries the first failure cause value and the identity request message, the terminal device may end the first IPsec connection and obtain the association parameter, where the association parameter is a parameter that is pre-negotiated by the terminal device with the gateway node and stored in the terminal device and that is used to associate the first IPsec connection with the second IPsec connection. Specifically, a method in which the terminal device negotiates with the gateway node may be that the terminal device negotiates with the gateway node through signaling interaction, or may be configured in a network management system in advance, or may be defined in a standard or a specification. Because the fourth message carries the identity request message, the terminal device may generate an identity reply message in response to the identity request message, and the identity reply message carries the permanent identifier. Then, the terminal device may negotiate with the gateway node to establish the second IPsec connection, and send the fifth message to the gateway node by using the second IPsec connection. In this case, the fifth message carries the identity reply message, and the identity reply message carries the permanent identifier.

Optionally, the fifth message may further carry the association parameter, and the association parameter is used to associate the first IPsec connection with the second IPsec connection, so that the gateway node may send, to the same control plane node, messages sent by the same terminal device by using different IPsec connections. In other words, when the fifth message carries the association parameter, the gateway node may determine, based on the association parameter, a specific control plane node to which a message that is in the fifth message and that carries the permanent identifier is to be sent. Specifically, the association parameter may be the temporary identifier previously added by the terminal device to the first message. Optionally, the terminal device may place the temporary identifier in a network access identifier (NAI). The gateway node may send, to the control plane node based on information in the temporary identifier, the message that carries the permanent identifier.

Optionally, when the fifth message carries no association parameter, the terminal device may add the association parameter in a process of establishing the second IPsec connection. Correspondingly, the gateway node may obtain, as an association parameter, a parameter generated when the gateway node establishes the second IPsec connection. For example, if the terminal device adds the SPI in the process of establishing the second IPsec connection, the gateway node may obtain an SPI generated when the second IPsec connection is established, and then the gateway node may compare the obtained SPI with the SPI added by the terminal device, and perform a next operation based on a comparison result.

It should be noted that the fifth message may be an IKEv2-AUTH-Request message, and the identity reply message may be a NAS message and may be carried in a VID payload in the fifth message.

(2) When the fourth message carries the first failure cause value and the EAP-AKA'/Identity-Request message, for processing of the first failure cause value, refer to the descriptions in the foregoing case (1). For the EAP-AKA'/Identity-Request message, the terminal device may generate an EAP-AKA'/Identity-Response message that is in response to the EAP-AKA'/Identity-Request message, and the EAP-AKA'/Identity-Response message carries the permanent identifier. Then, the terminal device may establish the second IPsec connection to the gateway node, and send the fifth message to the gateway node by using the second IPsec connection. In this case, the fifth message carries the EAP-AKA'/Identity-Response message, and the EAP-AKA'/Identity-Response message carries the permanent identifier.

Optionally, the fifth message may further carry the association parameter. Specifically, for a case in which the fifth message carries the association parameter, refer to the related descriptions in step 307 and the foregoing case (1).

It should be noted that the fifth message may be an IKEv2-AUTH-Request message, and the EAP-AKA'/Identity-Response message may be carried in a VID payload in the fifth message.

(3) When the fourth message carries the first failure cause value and the failure message, the terminal device may end the first IPsec connection and obtain the association parameter. The fourth message carries the failure message, and the terminal device may learn, based on the failure message, that the control plane node cannot determine the permanent identifier. In this case, the terminal device may re-initiate a registration request message, where the registration request message carries the permanent identifier of the terminal device. Then, the terminal device may establish the second IPsec connection to the gateway node, and send the fifth message to the gateway node by using the second IPsec connection. In this case, the fifth message carries the registration request message, and the registration request message carries the permanent identifier.

Optionally, the fifth message may further carry the association parameter. Specifically, for a case in which the fifth message carries the association parameter, refer to the related descriptions in the foregoing case (1).

It should be noted that the fifth message may be an IKEv2-AUTH-Request message, and the registration request message may be a NAS message and be carried in a VID payload in the fifth message.

In addition, when the fourth message carries the failure message, the terminal device may determine that a service requested by using the request message carried in the first message fails. In this case, from sending the first message to receiving the failure message that is in response to the first message, the terminal device completes a complete state machine. When the terminal device re-initiates the registration request message to the gateway node, it indicates that the terminal device starts a new state machine.

Step 408: The gateway node receives the fifth message sent by the terminal device, and sends a sixth message to the control plane node based on the fifth message, where the sixth message carries an identity reply message, and the identity reply message carries the permanent identifier of the terminal device.

After receiving the fifth message sent by the terminal device, the gateway node may process the fifth message, and then send, to the control plane node based on the fifth message, the sixth message that carries the permanent identifier of the terminal device.

Specifically, when the gateway node determines that the fifth message carries the association parameter, the gateway node may determine, based on the association parameter carried in the fifth message, whether a terminal device that currently sends the fifth message is the terminal device that previously sends the first message. Specifically, when the association parameter is the SPI or the cookie, the gateway node may search stored association parameters that belong to a plurality of terminal devices, to determine whether there is an association parameter that is the same as the association parameter carried in the fifth message. If the gateway node finds an association parameter that is the same as the association parameter carried in the fifth message, the gateway node may determine that the terminal device that currently sends the fifth message is the terminal device that previously sends the first message. In this case, the gateway node may determine, from a stored correspondence between an association parameter and a control plane node, the control plane node corresponding to the association parameter, and then send the sixth message to the determined control plane node. When the association parameter is the NAI and the NAI carries the previously used temporary identifier, the gateway node may search stored temporary identifiers that belong to a plurality of terminal devices, to determine whether there is a temporary identifier that is the same as the temporary identifier carried in the fifth message. If the gateway node finds a temporary identifier that is the same as the temporary identifier carried in the fifth message, the gateway node may determine that the terminal device that currently sends the fifth message is the terminal device that previously sends the first message. In this case, the gateway node may determine, from a stored correspondence between an association parameter and a control plane node, the control plane node corresponding to the association parameter, and then send the sixth message to the determined control plane node. Alternatively, the gateway node may not perform comparison for the temporary identifier carried in the fifth message, but directly send, based on the temporary identifier, the sixth message to the control plane node indicated by the temporary identifier. Specifically, the gateway node may directly reply, based on the permanent identifier of the terminal device that is carried in the fifth message, to the identity request message sent by the control plane node, in other words, the gateway node may directly add, to the sixth message, the message that is in the fifth message and that carries the permanent identifier of the terminal device, and send the sixth message to the control plane node.

After the gateway node determines the control plane node, the gateway node may send the sixth message to the control plane node based on the fifth message, where the sixth message carries the permanent identifier of the terminal device. Specifically, different other content is carried in the sixth message based on different content carried in the fifth message. The sixth message may be an N2 message.

(1) When the fifth message carries the identity reply message, the gateway node may directly use the identity reply message to respond to the previously received identity request message sent by the control plane node. In other words, the gateway node may directly add the identity reply message to the sixth message and send the sixth message to the control plane node.

Optionally, the gateway node may further generate an EAP-AKA'/Identity-Response message to trigger authentication. In this case, the sixth message may further carry the EAP-AKA'/Identity-Response message, and the EAP-AKA'/Identity-Response message may also carry the permanent identifier of the terminal device.

Optionally, the EAP-AKA'/Identity-Response message may be carried in the identity reply message. In this case, the permanent identifier of the terminal device is carried in the EAP-AKA'/Identity-Response message. In other words, the sixth message carries the identity reply message, the identity reply message carries the EAP-AKA'/Identity-Response message, and the EAP-AKA'/Identity-Response message carries the permanent identifier of the terminal device.

(2) When the fifth message carries the EAP-AKA'/Identity-Response message, the gateway node may generate an identity reply message to respond to the identity request message sent by the control plane node. Then, the gateway node may send the sixth message to the control plane node, where the sixth message may carry the identity reply message and the EAP-AKA'/Identity-Response message, and the identity reply message carries the permanent identifier.

Optionally, the EAP-AKA'/Identity-Response message may be carried in the identity reply message. In other words, the sixth message carries the identity reply message, the identity reply message carries the EAP-AKA'/Identity-Response message, and the EAP-AKA'/Identity-Response message carries the permanent identifier.

(3) When the fifth message carries the registration request message, the gateway node may generate an identity reply message to respond to the identity request message sent by the control plane node. Then, the gateway node may send the sixth message to the control plane node, where the sixth message carries the identity reply message, and the identity reply message carries the permanent identifier of the terminal device.

Optionally, the gateway node may further generate an EAP-AKA'/Identity-Response message to trigger authentication. In this case, the sixth message may further carry the EAP-AKA'/Identity-Response message, and the EAP-AKA'/Identity-Response message also carries the permanent identifier of the terminal device. Alternatively, the EAP-AKA'/Identity-Response message may be carried in the identity reply message. In this case, the EAP-AKA'/Identity-Response message carries the permanent identifier.

It should be noted that, it can be learned from the descriptions in the case (3) in step 407 that, when the terminal device determines, after receiving the failure message, that the terminal device fails to access the network, a first state machine is completed; and when the terminal device re-initiates registration, another state machine is started. However, the control plane node is still waiting for a response message about the identity request message in this case, in other words, the control plane node is still in the first state machine in this case. In this case, the gateway node replies to the control plane node with the identity reply message, so that the control plane node can continue the first state machine. Therefore, it can be learned that in this embodiment of this application, the gateway node may enable a state machine of the terminal device and a state machine of the control plane node to be out of synchronization, and the gateway node separately maintains the state machine on a terminal device side and the state machine on a control plane node side. In this way, the control plane node unnecessarily ends the first state machine and starts another state machine, thereby reducing complexity of an operation performed by the control plane node.

In this embodiment of this application, when obtaining no context of the terminal device, the control plane node may send, to the gateway node, the third message that carries the identity request message, to request the permanent identifier of the terminal device. When receiving the identity request message, the gateway node may send, to the terminal device, the first failure cause value used to associate the first IPsec connection with the second IPsec connection; and may further directly send the identity request message to the terminal device, or may send, to the terminal device, the EAP AKA'/Identity-Request message or the failure message generated based on the identity request message. Then, if the terminal device receives the identity request message, the terminal device may reply with the identity reply message that carries the permanent identifier of the terminal device, and the gateway node only needs to forward the identity reply message to the control plane node. If the terminal device receives the EAP-AKA'/Identity-Request message or the failure message, the terminal device replies with the corresponding message that carries the permanent identifier, and the gateway node generates the identity reply message based on the message with which the terminal device replies, to reply to the identity request message of the control plane node. Therefore, it can be learned that in this embodiment of this application, even if the control plane node obtains no context of the terminal device, the control plane node can obtain the permanent identifier of the terminal device through forwarding of the gateway node, so that it is possible that the terminal device successfully accesses a network. Compared with a prior-art access procedure in which access needs to be performed again once access fails, the method provided in this embodiment of this application makes an access procedure more convenient and more proper.

In addition, in this embodiment of this application, the gateway node may alternatively generate the EAP-AKA'/Identity-Request message based on the identity request message, to request the permanent identifier from the terminal device. In other words, the gateway node may request the permanent identifier from the terminal device when triggering authentication. A process of triggering authentication is combined with a process of obtaining the permanent identifier, so that a quantity of times of signaling interaction is reduced. It should be further noted that the gateway node may alternatively generate the failure message based on the identity request message, to request the permanent identifier from the terminal device. In this way, the gateway node needs to separately maintain the state machine on the terminal device side and the state machine on the control plane node side, so that the state machine on the terminal device side and the state machine on the control plane node side can be inconsistent with each other, thereby reducing complexity of an operation performed by the control plane node.

Figure 5A:
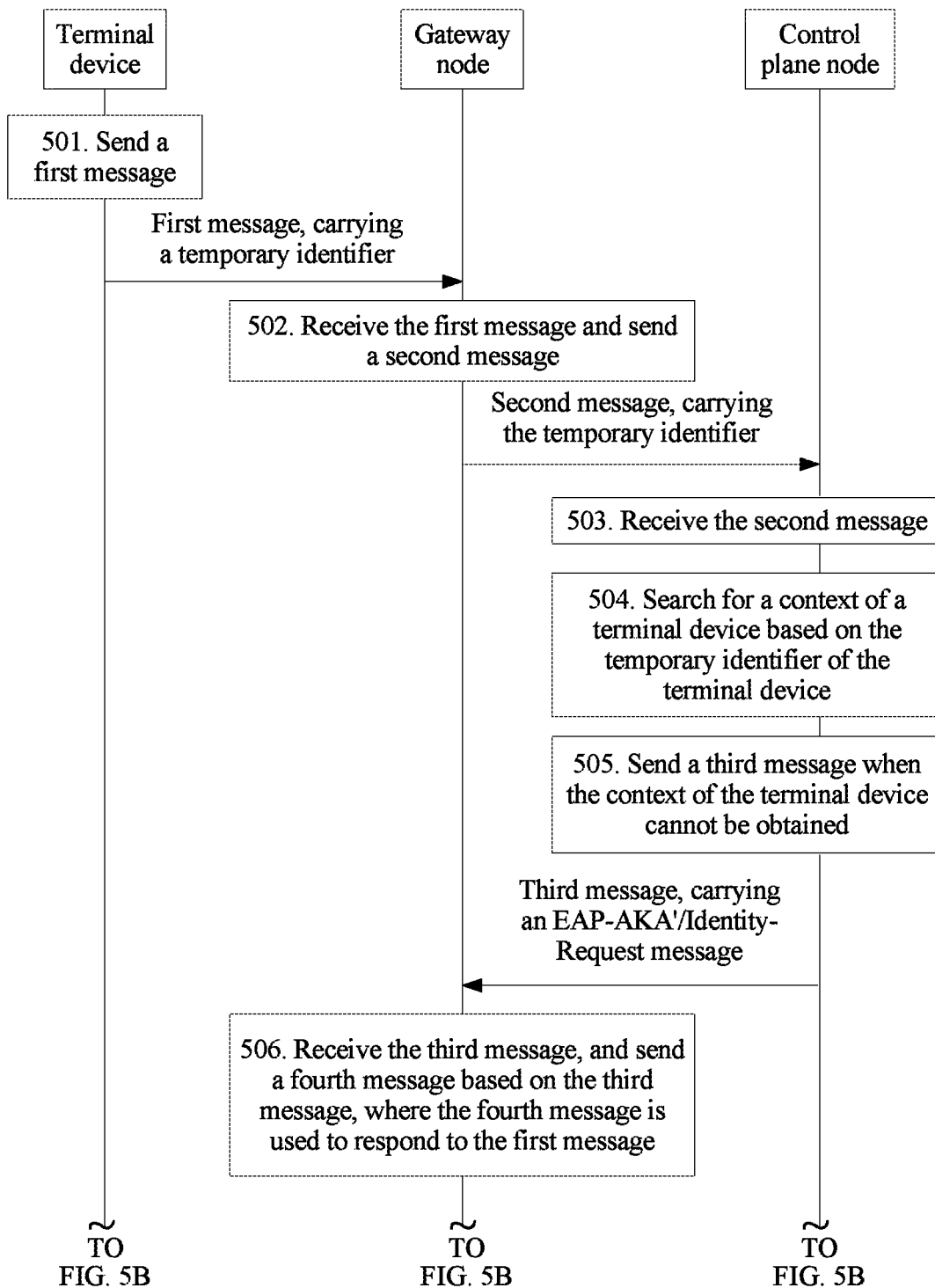
FIG. 5A and FIG. 5B are a flowchart of a method for obtaining an identifier of a terminal device according to an embodiment of this application.
Figure 5B:
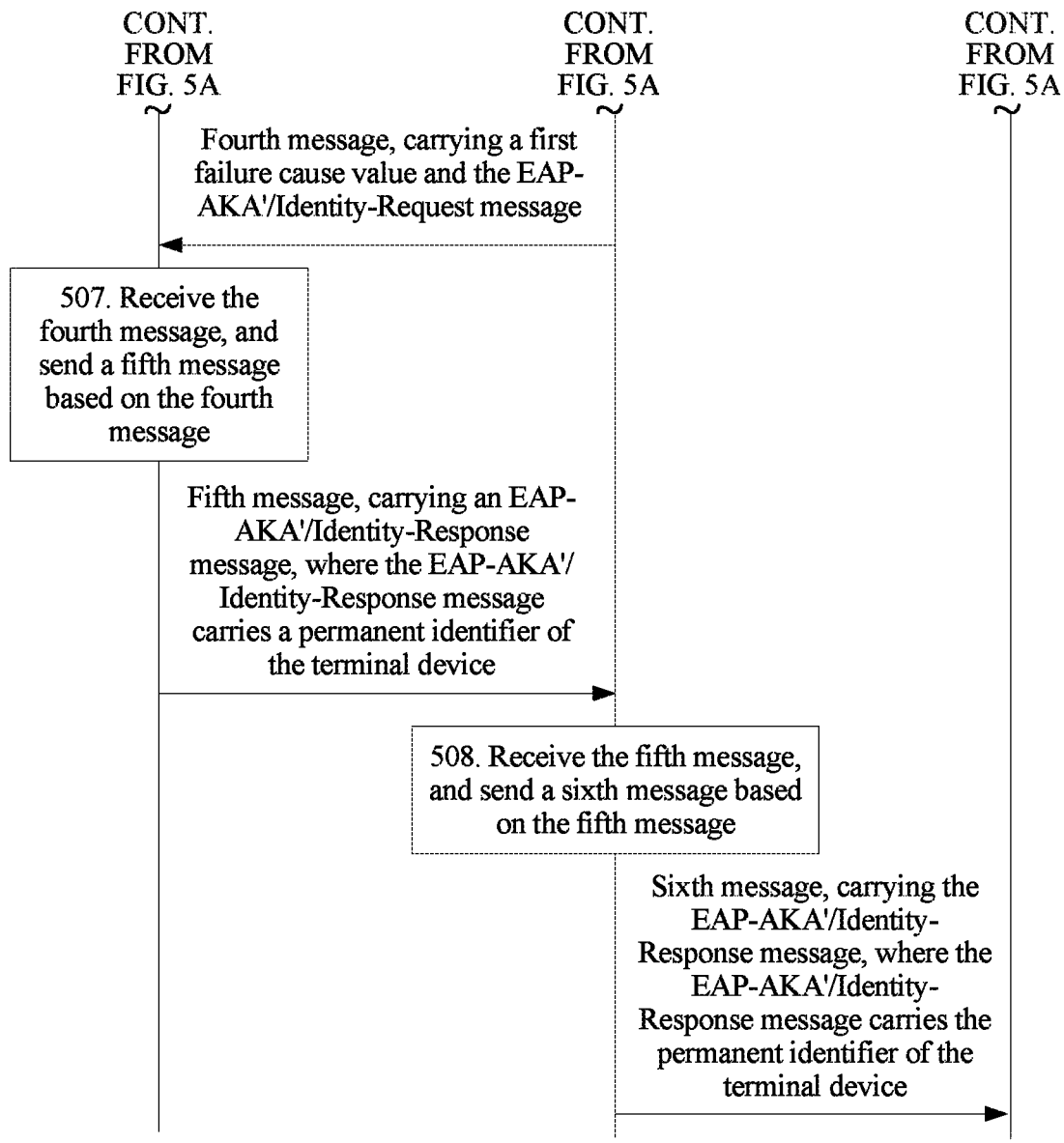

The foregoing embodiment describes the specific implementation process in which the control plane node obtains the identifier of the terminal device when the third message carries the identity request message. With reference to FIG. 5A and FIG. 5B, the following describes a specific implementation process in which the control plane node obtains the identifier of the terminal device when the third message carries the EAP-AKA'/Identity-Request message.

Step 501: A terminal device sends a first message to a gateway node, where the first message carries a temporary identifier of the terminal device.

For this step, refer to step 401 in the foregoing embodiment. Details are not described again in this embodiment of this application.

Step 502: The gateway node receives the first message sent by the terminal device, and sends a second message to a control plane node, where the second message carries the temporary identifier of the terminal device.

For this step, refer to step 402 in the foregoing embodiment. Details are not described again in this embodiment of this application.

Step 503: The control plane node receives the second message sent by the gateway node.

Step 504: The control plane node searches for a context of the terminal device based on the temporary identifier.

For this step, refer to step 404 in the foregoing embodiment. Details are not described again in this embodiment of this application.

Step 505: When the control plane node cannot obtain the context of the terminal device, the control plane node sends a third message to the gateway node, where the third message carries an EAP-AKA'/Identity-Request message.

When the control plane node cannot obtain the context of the terminal device, it indicates that the current control plane node cannot determine an identifier of the terminal device. In this case, the control plane node may authenticate the terminal device, so that the terminal device successfully accesses a network. Based on this, when the control plane node cannot obtain the context of the terminal device, the control plane node may directly trigger authentication, and perform a procedure of triggering authentication and a procedure of obtaining a permanent identifier of the terminal device together. Specifically, the control plane node may directly send, to the gateway node, the third message that carries the EAP-AKA'/Identity-Request message, to request the permanent identifier of the terminal device by triggering authentication.

Step 506: The gateway node receives the third message sent by the control plane node, and sends a fourth message to the terminal device based on the third message, where the fourth message is used to respond to the first message, and the fourth message carries a first failure cause value and the EAP-AKA'/Identity-Request message.

When receiving the third message sent by the control plane node, the gateway node may directly send, to the terminal device, the fourth message that carries the EAP-AKA'/Identity-Request message.

In addition, the third message carries the EAP-AKA'/Identity-Request message, which indicates that the control plane node subsequently can continue to authenticate the terminal device based on the replied permanent identifier. In this case, the gateway node needs to ensure that a terminal device to which the gateway node sends the fourth message to request the permanent identifier is the same as a terminal device that subsequently returns the permanent identifier. However, it can be learned from the descriptions in the foregoing embodiment that, after a first IPsec connection is disconnected, if two IPsec connections are not associated, the gateway node deletes information about the terminal device corresponding to the first IPsec connection. In this way, even if the terminal device returns a permanent identifier by using a second IPsec connection, the gateway node cannot determine whether the returned permanent identifier of the terminal device is the requested permanent identifier of the terminal device. In this way, the gateway node cannot send, to the control plane node that receives the second message, the permanent identifier in the fifth message received by using the second IPsec connection. In this case, the gateway node may further add the first failure cause value to the fourth message, so that the terminal device carries an association parameter, and then the gateway node may associate the first IPsec connection with the second IPsec connection based on the association parameter.

The first failure cause value may be used to notify the terminal device that the first IPsec connection fails.

Optionally, the first failure cause value may be further used to instruct the terminal device to send the association parameter, so that the gateway node may associate the first IPsec connection with the second IPsec connection based on the association parameter.

In addition, the fourth message may be an IKEv2-AUTH-Response message, and the EAP-AKA'/Identity-Request message may be carried in a VID payload in the fourth message. It should be further noted that the first failure cause value may be carried in an authentication payload or a notification payload in the fourth message or may be carried in another payload.

Step 507: The terminal device receives the fourth message sent by the gateway node, and sends a fifth message to the gateway node based on the fourth message, where the fifth message carries an EAP-AKA'/Identity-Response message, and the EAP-AKA'/Identity-Response message carries the permanent identifier of the terminal device.

When receiving the fourth message that carries the first failure cause value, the terminal device may determine that the two IPsec connections need to be associated. In this case, the terminal device ends the first IPsec connection to the gateway node and obtains the association parameter. Then, the terminal device may respond to the EAP-AKA'/Identity-Request message, and generate the EAP-AKA'/Identity-Response message based on the EAP-AKA'/Identity-Request message, where the EAP-AKA'/Identity-Response message carries the permanent identifier of the terminal device. Then, the terminal device may negotiate with the gateway node to establish the second IPsec connection, and send the fifth message to the gateway node by using the second IPsec connection. In this case, the fifth message may carry the EAP-AKA'/Identity-Response message, and the EAP-AKA'/Identity-Response message carries the permanent identifier of the terminal device.

Optionally, the fifth message may further carry the association parameter. For specific descriptions of the association parameter, refer to the related descriptions in step 307 and the case (1) in step 407 in the foregoing embodiment. Details are not described again in this embodiment of this application.

It should be noted that the fifth message may be an IKEv2-AUTH-Request message, and the EAP-AKA'/Identity-Response message may be carried in a VID payload in the fifth message.

Step 508: The gateway node receives the fifth message sent by the terminal device, and sends a sixth message to the control plane node based on the fifth message, where the sixth message carries the EAP-AKA'/Identity-Response message, and the EAP-AKA'/Identity-Response message carries the permanent identifier of the terminal device.

When the gateway node receives the fifth message, optionally, the gateway node may associate the first IPsec connection with the second IPsec connection based on the association parameter carried in the fifth message. For a specific implementation process, refer to the related descriptions in step 408 in the foregoing embodiment.

Optionally, the gateway node may send the sixth message to the control plane node based on the fifth message. Specifically, because the third message sent by the control plane node carries the EAP-AKA'/Identity-Request message, the gateway node may directly add the EAP-AKA'/Identity-Response message to the sixth message, to respond to the EAP-AKA'/Identity-Request message sent by the control plane node. The sixth message may be an N2 message. Specifically, the EAP-AKA'/Identity-Response message may be placed in a NAS container.

In this embodiment of this application, when obtaining no context of the terminal device, the control plane node may send, to the gateway node, the third message that carries the EAP-AKA'/Identity-Request message, to request the permanent identifier of the terminal device. When receiving the EAP-AKA'/Identity-Request message, the gateway node may send the fourth message to the terminal device, where the fourth message carries the first failure cause value used to associate the first IPsec connection with the second IPsec connection and the EAP-AKA'/Identity-Request message. When receiving the fourth message, the terminal device obtains the association parameter and generates the EAP-AKA'/Identity-Response message for replying to the EAP-AKA'/Identity-Request message, where the EAP-AKA'/Identity-Response message carries the permanent identifier of the terminal device. Then, the terminal device may send the fifth message to the gateway node, where the fifth message carries the association parameter and the EAP-AKA'/Identity-Response message, and after receiving the fifth message, the gateway node only needs to forward the EAP-AKA'/Identity-Response message to the control plane node. Therefore, it can be learned that in this embodiment of this application, even if the control plane node cannot obtain the context of the terminal device, the control plane node can obtain the permanent identifier of the terminal device through forwarding of the gateway node, so that it is possible that the terminal device successfully accesses a network. Compared with a prior-art access procedure in which access needs to be performed again once access fails, the method provided in this embodiment of this application makes an access procedure more convenient and more proper. In addition, in this embodiment of this application, after failing to obtain the context of the terminal device, the control plane node directly triggers authentication. An authentication procedure is combined with a process of obtaining the permanent identifier of the terminal device, so that a quantity of times of signaling interaction is reduced.

The foregoing two embodiments separately describe the specific implementation processes when the third message carries only the identity request message or carries only the EAP-AKA'/Identity-Request message. During actual application, the control plane node may trigger an authentication procedure when obtaining the permanent identifier. In other words, the control plane node may add both the identity request message and the EAP-AKA'/Identity-Request message to the third message.

When the third message carries both the identity request message and the EAP-AKA'/Identity-Request message, the gateway node may unnecessarily generate the EAP-AKA'/Identity-Request message to trigger an authentication procedure. In this case, the gateway node may send a fourth message to the terminal device, where the fourth message may carry the identity request message, the EAP-AKA'/Identity-Request message, and the first failure cause value. When receiving the fourth message, the terminal device generates an identity reply message based on the identity request message, generates an EAP-AKA'/Identity-Response message based on the EAP-AKA'/Identity-Request message, ends the first IPsec connection, obtains the association parameter, and establishes the second IPsec connection. Both the identity reply message and the EAP-AKA'/Identity-Response message may carry the permanent identifier of the terminal device. Then, the terminal device sends a fifth message to the gateway node, where the fifth message may carry the identity reply message, the EAP-AKA'/Identity-Response message, and the association parameter. After receiving the fifth message, the gateway node may associate the first IPsec connection with the second IPsec connection based on the association parameter, and send a sixth message to the control plane node, where the sixth message carries the identity reply message and the EAP-AKA'/Identity-Response message.

Figure 6A:
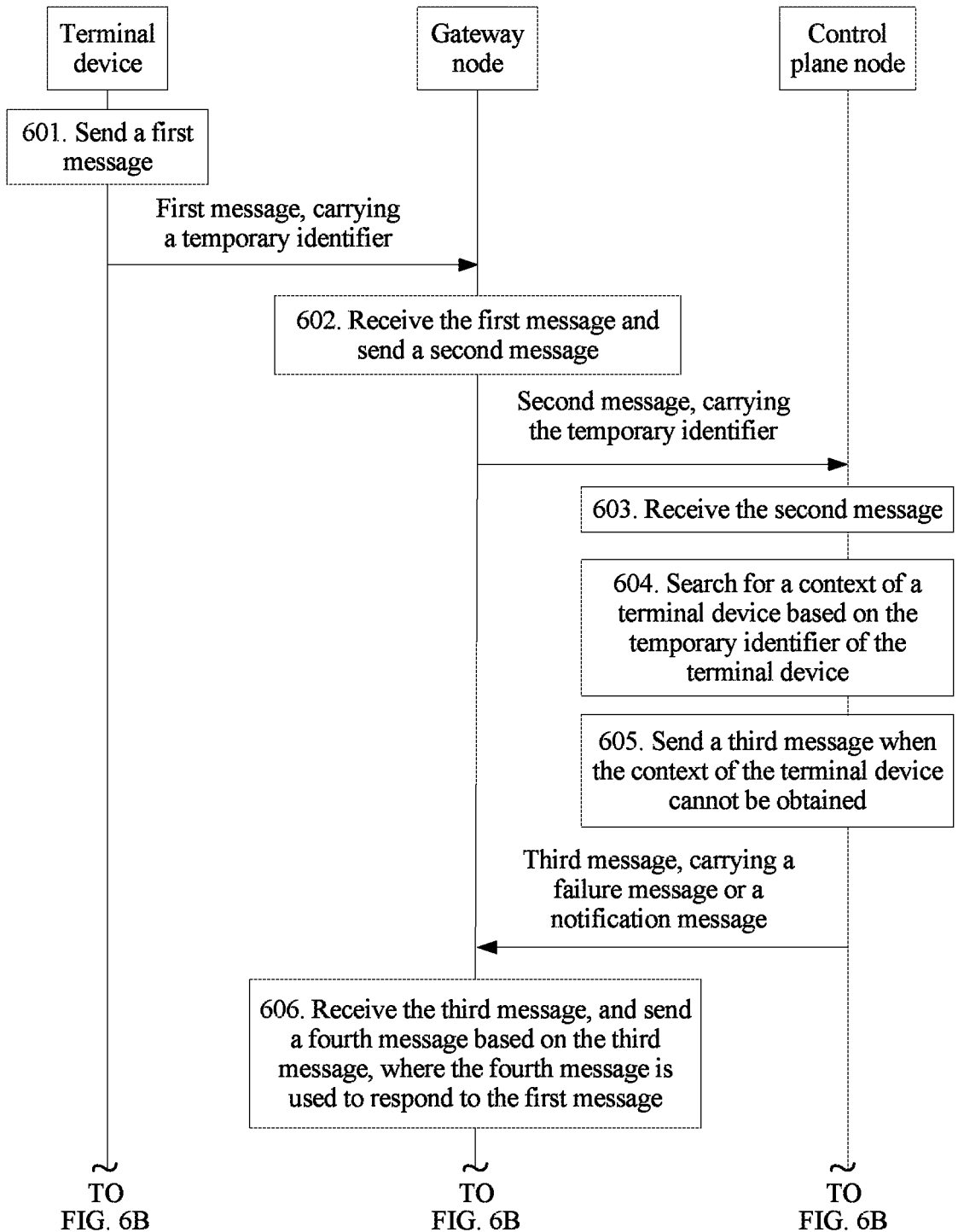
FIG. 6A and FIG. 6B are a flowchart of a method for obtaining an identifier of a terminal device according to an embodiment of this application.
Figure 6B:
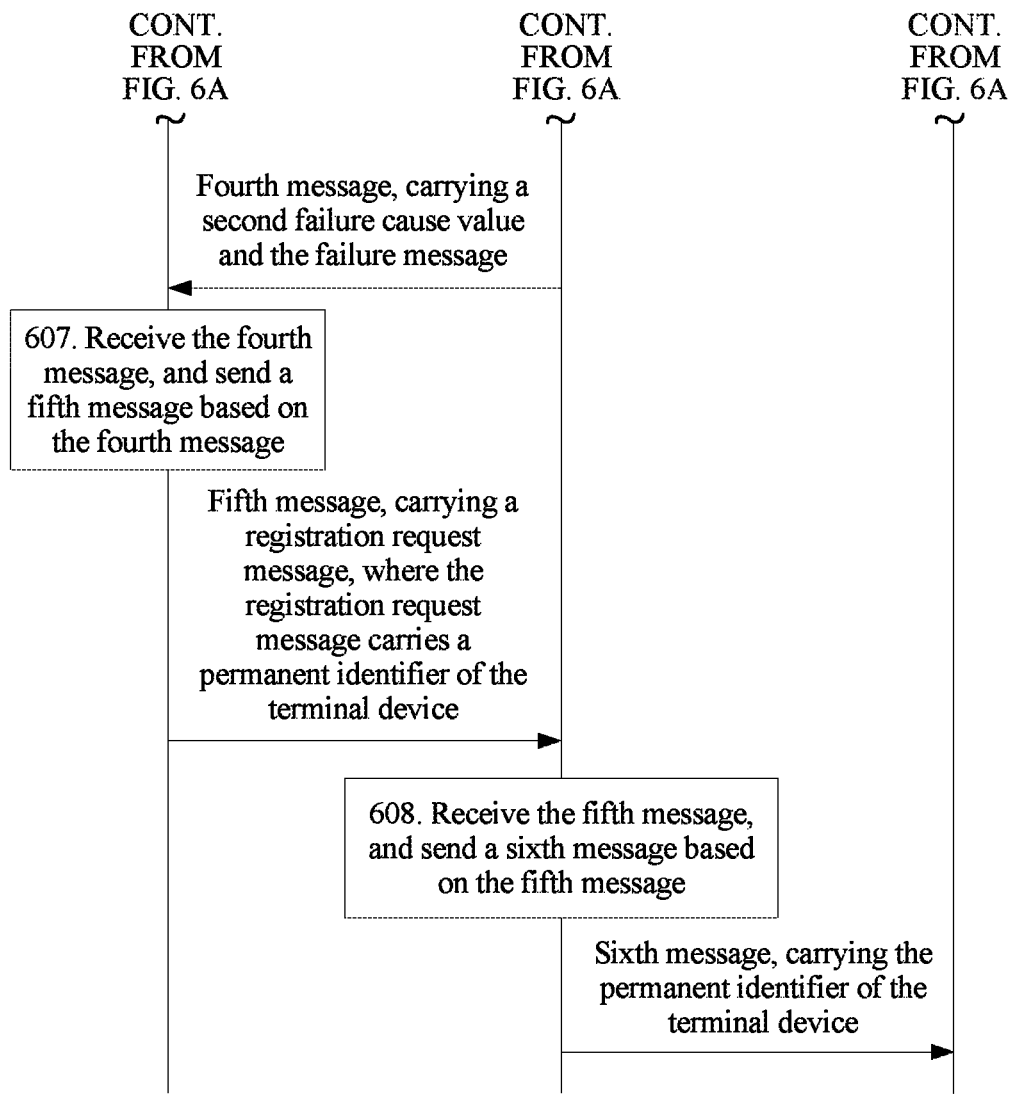

The foregoing embodiment describes the specific implementation process in which the control plane node obtains the identifier of the terminal device when the third message carries the EAP-AKA'/Identity-Request message. With reference to FIG. 6A and FIG. 6B, the following describes a specific implementation process in which the control plane node obtains the identifier of the terminal device when the third message carries the failure message or the notification message.

Step 601: A terminal device sends a first message to a gateway node, where the first message carries a temporary identifier of the terminal device.

For this step, refer to step 401 in the foregoing embodiment. Details are not described again in this embodiment of this application.

Step 602: The gateway node receives the first message sent by the terminal device, and sends a second message to a control plane node, where the second message carries the temporary identifier of the terminal device.

For this step, refer to step 402 in the foregoing embodiment. Details are not described again in this embodiment of this application.

Step 603: The control plane node receives the second message sent by the gateway node.

Step 604: The control plane node searches for a context of the terminal device based on the temporary identifier.

For this step, refer to step 404 in the foregoing embodiment. Details are not described again in this embodiment of this application.

Step 605: When the control plane node cannot obtain the context of the terminal device, the control plane node sends a third message to the gateway node, where the third message carries a failure message or a notification message.

When the control plane node finds no context of the terminal device, the control plane node cannot respond to a request of the terminal device, in other words, the request initiated by the terminal device fails. For example, assuming that the terminal device sends a registration request message in the first message, when the control plane node cannot find the context of the terminal device, it may be determined that current registration fails. Therefore, the control plane node may generate a failure message, where the failure message may be used to notify the terminal device that the control plane node cannot determine a permanent identifier of the terminal device. For another example, the control plane node finds the context of the terminal device, but integrity protection verification performed by the control plane node fails. In this case, the control plane node may generate a failure message, where the failure message may be used to notify the terminal device that the integrity protection verification performed by the control plane node fails and therefore the control plane node cannot determine the permanent identifier of the terminal device.

It should be noted that the failure message carries a cause value, and the control plane node may add different cause values to the failure message based on different failure types. For example, assuming that a request message of the terminal device is a registration request message, the cause value added by the control plane node is a cause value corresponding to a registration failure. Herein, a failure type is the registration failure.

In another possible implementation, when the control plane node obtains no context of the terminal device, the control plane node may directly generate, based on specific information that is not obtained, a notification message that carries a corresponding cause value, to notify the gateway node that the control plane node cannot determine the context of the terminal device. For example, assuming that the control plane node finds no permanent identifier in the context, the control plane node may generate a notification message, where the notification message carries a cause value used to identify a failure to find the permanent identifier.

It should be noted that the failure message may be a NAS message. The notification message may be a NAS message, or may not be a NAS message.

Step 606: The gateway node receives the third message sent by the control plane node, and sends a fourth message to the terminal device based on the third message, where the fourth message is used to respond to the first message, the fourth message carries a second failure cause value, and the fourth message carries the failure message.

When the gateway node determines, by parsing a NAS message in the third message, that the third message carries the failure message, the gateway node may directly send, to the terminal device, the fourth message that carries the failure message. In addition, because the control plane node has determined that the request of the terminal device fails, it may be determined that a first state machine starting from the first message of the terminal device has been disconnected on a control plane node side. In this case, the gateway node may no longer maintain an association between a first IPsec connection and a subsequent second IPsec connection. Therefore, the gateway node may add the second failure cause value to the fourth message, where the second failure cause value is used to notify the terminal device that the first IPsec connection fails, but the second failure cause value cannot instruct the terminal device to associate the first IPsec connection with the second IPsec connection.

When determining that the third message carries the notification message, the gateway node may determine, based on the notification message, that the control plane node cannot determine an identifier of the terminal device. With reference to this embodiment, specifically, the gateway node may determine, based on the notification message, that the request of the terminal device fails, in other words, the control plane node rejects the request of the terminal device. In this case, the gateway node may generate a registration reject message based on the notification message, and send, to the terminal device, a fourth message that carries the registration reject message, to notify the terminal device that a registration request is rejected. Likewise, because the control plane node has determined that the control plane node fails to obtain the context and does not send another specific request message, it may be determined that a first state machine starting from the first message of the terminal device has been disconnected on a control plane node side. In this case, the gateway node may no longer maintain an association between a first IPsec connection and a subsequent second IPsec connection. Therefore, the gateway node may add the second failure cause value to the fourth message, to notify the terminal device that the first IPsec connection fails, but does not instruct the terminal device to associate the two IPsec connections.

It should be noted that, in this embodiment of this application, the registration reject message may be a type of failure message.

Step 607: The terminal device receives the fourth message sent by the gateway node, and sends a fifth message to the gateway node based on the fourth message, where the fifth message carries a registration request message, and the registration request message carries the permanent identifier of the terminal device.

It can be learned from the descriptions in step 606 that when the third message carries the failure message or the notification message, the fourth message may carry the second failure cause value. When the terminal device determines that the fourth message carries the second failure cause value, the terminal device may end the first IPsec connection to the gateway node, and determine that the first IPsec connection does not need to be associated with the second IPsec connection. Apparently, the terminal device does not need to obtain an association parameter, and then the terminal device may negotiate with the gateway node to establish the second IPsec connection.

In addition, regardless of whether the fourth message carries the failure message or the registration reject message, the terminal device may determine, based on the failure message or the registration reject message, that registration fails or a requested service fails. In this case, the terminal device may generate the registration request message based on the failure message or the registration reject message, and send, to the gateway node, the fifth message that carries the registration request message, to re-initiate registration. The registration request message carries the permanent identifier of the terminal device.

Optionally, the fifth message may be an IKEv2-AUTH-Request message, and the registration request message may be carried in a VID payload in the fifth message. Optionally, the fifth message is transmitted by using the second IPsec connection. Specifically, before sending the fifth message, the terminal device establishes the second IPsec connection to the gateway node.

Step 608: The gateway node receives the fifth message sent by the terminal device, and sends a sixth message to the control plane node based on the fifth message, where the sixth message carries the permanent identifier of the terminal device.

After receiving the fifth message sent by the terminal device, the gateway node may send the sixth message to the control plane node, where the sixth message carries the registration request message.

Optionally, the gateway node may send a sixth message that carries only the registration request message. Alternatively, the gateway node may further generate an EAP-AKA'/Identity-Response message, and add the EAP-AKA'/Identity-Response message to the sixth message, to trigger authentication. In other words, the sixth message may carry both the EAP-AKA'/Identity-Response message and the registration request message, and both the EAP-AKA'/Identity-Response message and the registration request message may carry the permanent identifier of the terminal device.

In this embodiment of this application, when the control plane node cannot obtain the context of the terminal device, the control plane node may send, to the gateway node, the third message that carries the failure message or the notification message, to request the permanent identifier of the terminal device. When receiving the failure message or the notification message, the gateway node may send the fourth message to the terminal device. Regardless of whether the third message carries the failure message or the notification message, a state machine on the control plane node side has been completed. In this case, the fourth message carries the second failure cause value, used to instruct the terminal device not to associate the first IPsec connection with the second IPsec connection. In addition, if the third message carries the failure message, the gateway node may directly send, to the terminal device, the fourth message that carries the failure message and the second failure cause value. If the third message carries the notification message, the gateway node may generate the registration reject message based on the notification message, and then send, to the terminal device, the fourth message that carries the registration reject message and the second failure cause value. When the terminal device receives the fourth message, regardless of whether the fourth message carries the failure message or the registration reject message, the terminal device may generate the registration request message, and send the registration request message to the gateway node by using the second IPsec connection, to re-initiate registration. When receiving the registration request message, the gateway node may directly send, to the control plane node, the sixth message that carries the registration request message, or max also add the EAP-AKA'/Identity-Response message in the sixth message, to trigger authentication. Therefore, it can be learned that in this embodiment of this application, even if the control plane node obtains no context of the terminal device, the control plane node can obtain the permanent identifier of the terminal device through forwarding of the gateway node, so that it is possible that the terminal device successfully accesses a network.

Figure 7A:
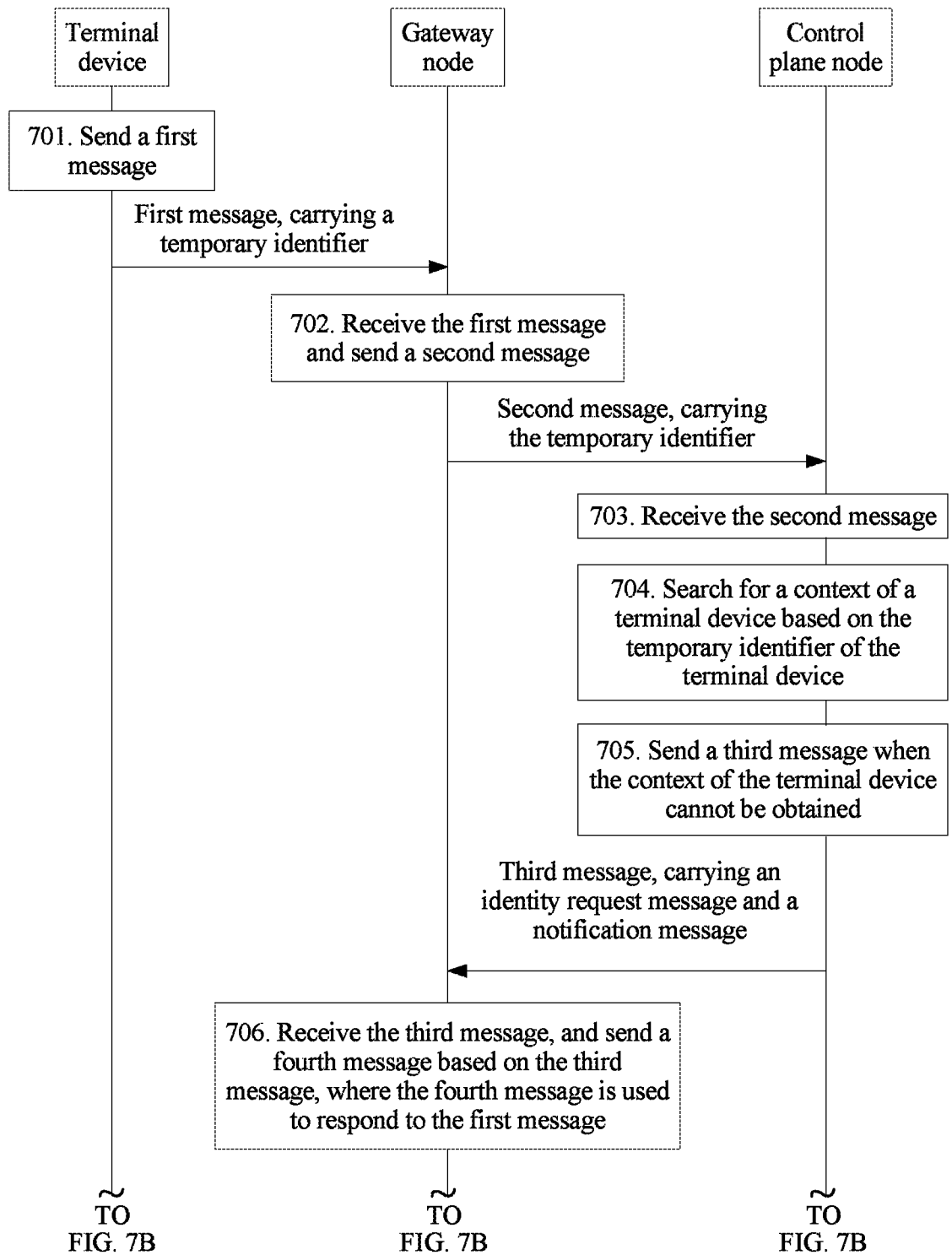
FIG. 7A and FIG. 7B are a flowchart of a method for obtaining an identifier of a terminal device according to an embodiment of this application.
Figure 7B:
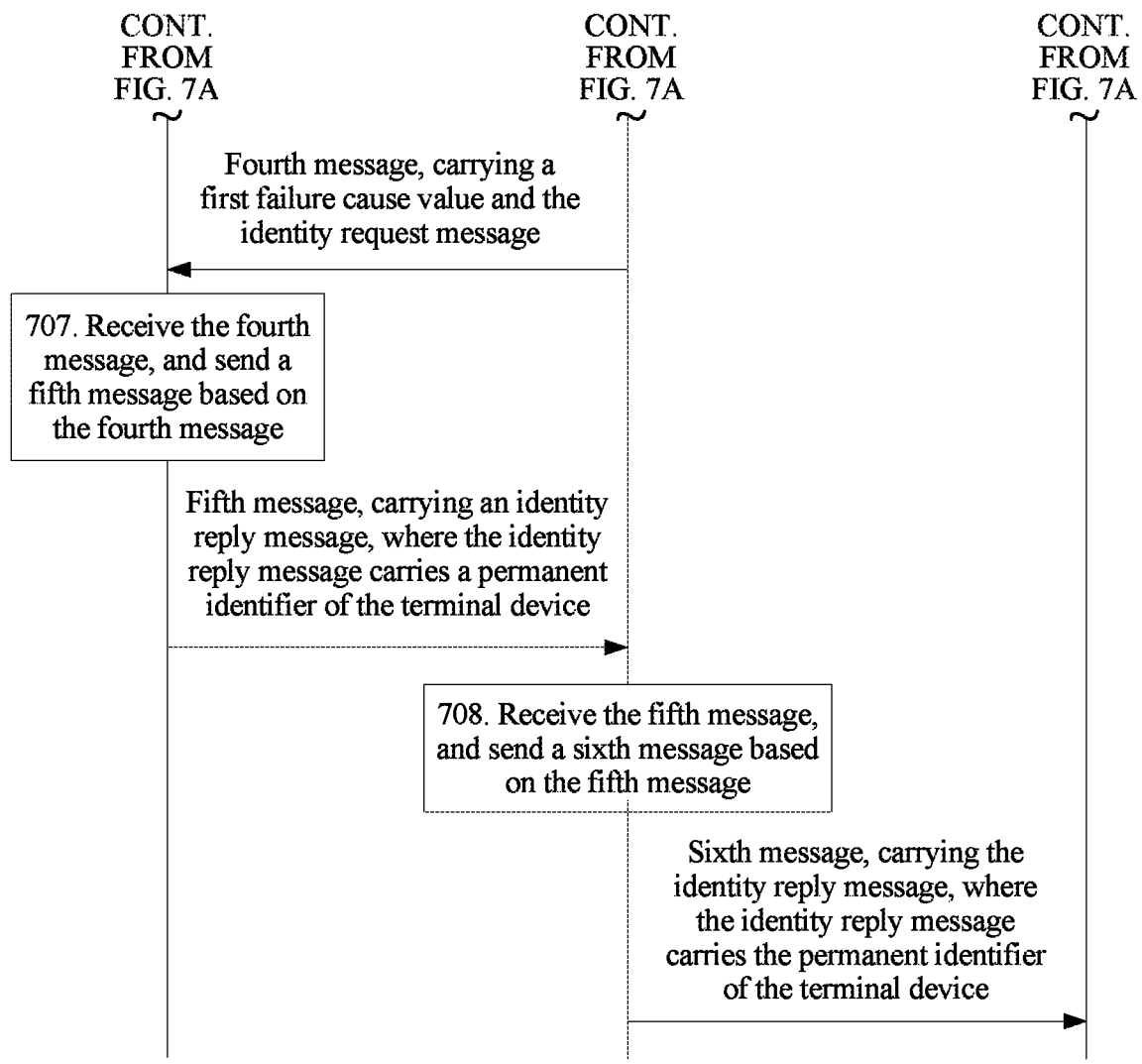

The foregoing embodiments separately describe the specific implementation processes of the embodiments of this application when the third message carries one of the identity request message, the EAP-AKA'/Identity-Request message, the failure message, and the notification message. In addition, the control plane node may add both the identity request message and the notification message, or both the EAP-AKA'/Identity-Request message and the notification message, or both the failure message and the notification message to the third message. With reference to FIG. 7A and FIG. 7B, the following describes a specific implementation process of the embodiments of this application when the third message carries both the identity request message and the notification message.

Step 701: A terminal device sends a first message to a gateway node, where the first message carries a temporary identifier of the terminal device.

For this step, refer to step 401 in the foregoing embodiment. Details are not described again in this embodiment of this application.

Step 702: The gateway node receives the first message sent by the terminal device, and sends a second message to a control plane node, where the second message carries the temporary identifier of the terminal device.

For this step, refer to step 402 in the foregoing embodiment. Details are not described again in this embodiment of this application.

Step 703: The control plane node receives the second message sent by the gateway node.

Step 704: The control plane node searches for a context of the terminal device based on the temporary identifier.

For this step, refer to step 404 in the foregoing embodiment. Details are not described again in this embodiment of this application.

Step 705: When the control plane node cannot obtain the context of the terminal device, the control plane node sends a third message to the gateway node, where the third message carries an identity request message and a notification message.

In this case, the notification message may carry a first cause value. When receiving a message from the terminal device again, the gateway node may send the received message of the terminal device to the control plane node based on the carried first cause value.

It should be noted that the first cause value carried in the notification message may also be used in a case in which the third message carries an EAP-AKA'/Identity-Request message.

Specifically, there may be a plurality of possible cause values in the notification message. For example, the cause value may be a cause value for instructing the gateway node to: when receiving a message from the terminal device again, send the received message of the terminal device to the control plane node.

Step 706: The gateway node receives the third message sent by the control plane node, and sends a fourth message to the terminal device based on the third message, where the fourth message is used to respond to the first message, and the fourth message carries the first failure cause value and the identity request message.

After receiving the third message, the gateway node may send, to the terminal device, the fourth message that carries the identity request message, and the gateway node may determine, based on the first cause value carried in the notification message, to associate a first IPsec connection with a subsequent second IPsec connection. In other words, the fourth message may further carry the first failure cause value.

Step 707: The terminal device receives the fourth message sent by the gateway node, and sends a fifth message to the gateway node based on the fourth message, where the fifth message carries an identity reply message, and the identity reply message carries a permanent identifier of the terminal device.

For this step, refer to the descriptions in the case (1) in step 407 in the foregoing embodiment. Details are not described again in this embodiment of this application.

Step 708: The gateway node receives the fifth message sent by the terminal device, and sends a sixth message to the control plane node based on the fifth message, where the sixth message carries the identity reply message, and the identity reply message carries the permanent identifier of the terminal device.

For this step, refer to the descriptions in the case (1) in step 408 in the foregoing embodiment. Details are not described again in this embodiment of this application.

In this embodiment of this application, when the control plane node cannot obtain the context of the terminal device, the control plane node may send, to the gateway node, the third message that carries the notification message and the identity request message, to request the permanent identifier of the terminal device. When receiving the notification message and the identity request message, the gateway node may not parse the identity request message, but determine, based on the notification message, to associate the first IPsec connection with the second IPsec connection. Then, the gateway node sends, to the terminal device, the fourth message that carries the identity request message and the first failure cause value, to request the permanent identifier from the terminal device. Therefore, it can be learned that in this embodiment of this application, even if the control plane node obtains no context of the terminal device, the control plane node can obtain the permanent identifier of the terminal device through forwarding of the gateway node, so that it is possible that the terminal device successfully accesses a network. Compared with a prior-art access procedure in which access needs to be performed again once access fails, the method provided in this embodiment of this application makes an access procedure more convenient and more proper. In addition, in this embodiment of this application, the notification message and the identity request message are sent to the gateway node together. Therefore, the gateway node can complete a subsequent procedure without parsing the identity request message, thereby reducing complexity of an operation performed by the gateway node.

The foregoing embodiment describes the specific implementation process when the third message carries both the notification message and the identity request message. When the third message carries both the notification message and the EAP-AKA'/Identity-Request message, for processing performed by the gateway node when the gateway node receives the third message, refer to step 706 in the foregoing embodiment. Then, a fourth message sent by the gateway node to the terminal device may carry the first failure cause value and the EAP-AKA'/Identity-Request message. For a specific implementation process in which the terminal device sends a fifth message to the gateway node based on the fourth message after receiving the fourth message and a specific implementation process in which the gateway node sends a sixth message to the control plane node based on the fifth message, respectively refer to steps 507 and 508 in the foregoing embodiment. Details are not described in this embodiment of this application.

When the third message carries both the notification message and the failure message, the notification message may carry a second cause value. When receiving the third message, the gateway node may determine, based on the second cause value in the notification message, not to associate the two IPsec connections. In this way, the gateway node may send, to the terminal device, a fourth message that carries the second failure cause value and the failure message. For a specific implementation process in which the terminal device sends a fifth message to the gateway node based on the fourth message after receiving the fourth message and a specific implementation process in which the gateway node sends a sixth message to the control plane node based on the fifth message, respectively refer to steps 607 and 608 in the foregoing embodiment. Details are not described in this embodiment of this application.

After the specific implementation process of the embodiments of this application is described, the following describes apparatuses in the embodiments of this application.

Figure 8:
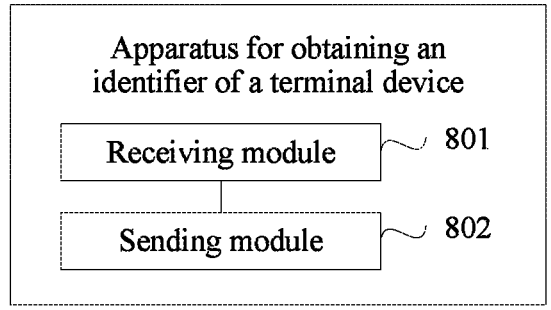
FIG. 8 is a schematic structural diagram of an apparatus for obtaining an identifier of a terminal device according to an embodiment of this application.

Referring to FIG. 8, an embodiment of this application provides an apparatus for obtaining an identifier of a terminal device. The apparatus is included in a gateway node, and the apparatus includes:

a receiving module 801, configured to perform step 302, the step of receiving the fourth message sent by the control plane node in step 306, and the step of receiving the fifth message sent by the terminal device in step 308 in the foregoing embodiment, and a sending module 802, configured to perform the step of receiving the third message sent by the control plane node in step 306 and the step of sending the permanent identifier to the control plane node in step 308 in the foregoing embodiment.

Optionally, the sending module 802 includes:

a sending submodule, configured to: when the third message carries an identity request message and the identity request message is used to request the permanent identifier of the terminal device, send the fourth message to the terminal device by using a first internet protocol security IPsec connection between the gateway node and the terminal device, where the fourth message carries the identity request message and a first failure cause value.

The first failure cause value is used to notify the terminal device that the first IPsec connection fails, the first failure cause value is further used to instruct the terminal device to send an association parameter to associate the first IPsec connection with a second IPsec connection, the association parameter is a parameter used to associate the first IPsec connection with the second IPsec connection, and the second IPsec connection is an IPsec connection established after the first IPsec connection is disconnected.

Optionally, the fifth message carries an identity reply message and the association parameter, the identity reply message is used to respond to the identity request message, and the identity reply message carries the permanent identifier of the terminal device.

The sending submodule is configured to:

send a sixth message to the control plane node based on the association parameter, where the sixth message carries the identity reply message and an EAP-AKA'/Identity-Response message, and both the identity reply message and the EAP-AKA'/Identity-Response message carry the permanent identifier; or the sixth message carries the identity reply message, the identity reply message carries the EAP-AKA'/Identity-Response message, and the EAP-AKA'/Identity-Response message carries the permanent identifier; or send a sixth message to the control plane node based on the association parameter, where the sixth message carries the identity reply message, and the identity reply message carries the permanent identifier of the terminal device.

Optionally, the sending module 802 includes:

a sending submodule, configured to: when the third message carries an identity request message and the identity request message is used to request the permanent identifier of the terminal device, send the fourth message to the terminal device by using a first IPsec connection between the gateway node and the terminal device, where the fourth message carries an EAP-AKA'/Identity-Request message and a first failure cause value.

The EAP-AKA'/Identity-Request message is used to trigger an authentication procedure for the terminal device, the first failure cause value is used to notify the terminal device that the first IPsec connection fails, the first failure cause value is further used to instruct the terminal device to send an association parameter to associate the first IPsec connection with a second IPsec connection, the association parameter is a parameter used to associate the first IPsec connection with the second IPsec connection, and the second IPsec connection is an IPsec connection established after the first IPsec connection is disconnected.

Optionally, the fifth message carries an EAP-AKA'/Identity-Response message and the association parameter, the EAP-AKA'/Identity-Response message is used to respond to the EAP-AKA'/Identity-Request message, and the EAP-AKA'/Identity-Response message carries the permanent identifier of the terminal device.

The sending submodule is configured to:

send a sixth message to the control plane node based on the association parameter.

The sixth message carries an identity reply message and the EAP-AKA'/Identity-Response message, the identity reply message is used to respond to the identity request message, and the identity reply message carries the permanent identifier of the terminal device; or the sixth message carries the identity reply message, the identity reply message carries the EAP-AKA'/Identity-Response message, and the EAP-AKA'/Identity-Response message carries the permanent identifier of the terminal device.

Optionally, the sending module 802 includes:

a sending submodule, configured to: when the third message carries an identity request message and the identity request message is used to request the permanent identifier of the terminal device, send the fourth message to the terminal device by using a first IPsec connection between the gateway node and the terminal device, where the fourth message carries a failure message and a first failure cause value.

The failure message is used to indicate that a context of the terminal device fails to be obtained, the first failure cause value is used to notify the terminal device that the first IPsec connection fails, the first failure cause value is further used to instruct the terminal device to send an association parameter to associate the first IPsec connection with a second IPsec connection, the association parameter is a parameter used to associate the first IPsec connection with the second IPsec connection, and the second IPsec connection is an IPsec connection established after the first IPsec connection is disconnected.

Optionally, the fifth message carries a registration request message and the association parameter, and the registration request message carries the permanent identifier of the terminal device.

The sending submodule is configured to:

send a sixth message to the control plane node based on the association parameter, where the sixth message carries an identity reply message, the identity reply message is used to respond to the identity request message, and the identity reply message carries the permanent identifier of the terminal device.

Optionally, the sending module includes:

a sending submodule, configured to: when the third message carries an EAP-AKA'/Identity-Request message and the EAP-AKA'/Identity-Request message is used to trigger an authentication procedure for the terminal device, send the fourth message to the terminal device by using a first IPsec connection between the gateway node and the terminal device, where the fourth message carries the EAP-AKA'/Identity-Request message and a first failure cause value.

The first failure cause value is used to notify the terminal device that the first IPsec connection fails, the first failure cause value is further used to instruct the terminal device to send an association parameter to associate the first IPsec connection with a second IPsec connection, the association parameter is a parameter used to associate the first IPsec connection with the second IPsec connection, and the second IPsec connection is an IPsec connection established after the first IPsec connection is disconnected.

Optionally, the fifth message carries an EAP-AKA'/Identity-Response message and the association parameter, the EAP-AKA'/Identity-Response message is used to respond to the EAP-AKA'/Identity-Request message, and the EAP-AKA'/Identity-Response message carries the permanent identifier of the terminal device.

The sending submodule is configured to:

send a sixth message to the control plane node based on the association parameter, where the sixth message carries the EAP-AKA'/Identity-Response message.

Optionally, the sending module 802 includes:

a sending submodule, configured to: when the third message carries a failure message and the failure message is used to indicate that the control plane node fails to obtain a context of the terminal device, send the fourth message to the terminal device by using a first IPsec connection between the gateway node and the terminal device, where the fourth message carries the failure message and a second failure cause value.

The second failure cause value is used to notify the terminal device that the first IPsec connection fails, and associate the first IPsec connection with a second IPsec connection, and the second IPsec connection is an IPsec connection established after the first IPsec connection is disconnected.

Optionally, the sending submodule is further configured to:

when the third message carries a notification message and the notification message is used to notify the gateway node that the control plane node fails to obtain a context of the terminal device, send the fourth message to the terminal device by using a first IPsec connection between the gateway node and the terminal device, where the fourth message carries a registration reject message and a second failure cause value.

The second failure cause value is used to notify the terminal device that the first IPsec connection fails.

Optionally, the fifth message carries a registration request message, and the registration request message carries the permanent identifier of the terminal device.

The sending module 802 includes:

the sending submodule, configured to send a sixth message to the control plane node, where the sixth message carries the registration request message; or the sending submodule is further configured to send a sixth message to the control plane node, where the sixth message carries the registration request message and an EAP-AKA'/Identity-Response message, and the EAP-AKA'/Identity-Response message is used to trigger an authentication procedure for the terminal device.

Figure 9:
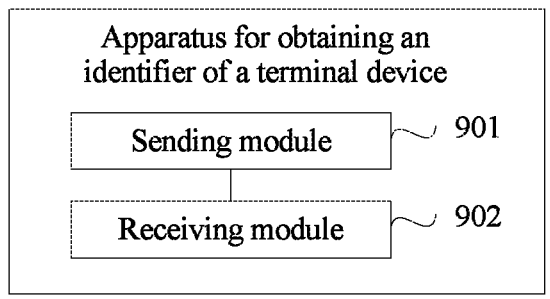
FIG. 9 is a schematic structural diagram of an apparatus for obtaining an identifier of a terminal device according to an embodiment of this application.

Referring to FIG. 9, an embodiment of this application provides an apparatus for obtaining an identifier of a terminal device. The apparatus is included in a terminal device, and the apparatus includes:

a sending module 901, configured to perform step 301 and the step of sending the fifth message to the gateway node based on the fourth message in step 307 in the foregoing embodiment; and a receiving module 902, configured to perform the step of receiving the fourth message sent by the gateway node in step 307 in the foregoing embodiment.

Optionally, the sending module 901 includes:

a sending submodule, configured to: when the fourth message carries an identity request message, send the fifth message to the gateway node, where the fifth message carries an identity reply message, the identity reply message is used to respond to the identity request message, and the identity reply message carries a permanent identifier of the terminal device; or the sending submodule is further configured to: when the fourth message carries an EAP-AKA'/Identity-Request message, send the fifth message to the gateway node, where the fifth message carries an EAP-AKA'/Identity-Response message, the EAP-AKA'/Identity-Request message is used to trigger an authentication procedure for the terminal device, and the EAP-AKA'/Identity-Response message is used to respond to the EAP-AKA'/Identity-Request message, and the EAP-AKA'/Identity-Response message carries a permanent identifier of the terminal device; or the sending submodule is further configured to: when the fourth message carries a failure message, send the fifth message to the gateway node, where the fifth message carries a registration request message, and the registration request message carries a permanent identifier of the terminal device.

Optionally, the fourth message further carries a first failure cause value, the first failure cause value is used to notify the terminal device that a first IPsec connection fails, the first failure cause value is further used to instruct the terminal device to send an association parameter to associate the first IPsec connection with a second IPsec connection, and the association parameter is a parameter used to associate the first IPsec connection with the second IPsec connection.

The sending module 901 is further configured to:

end the first IPsec connection between the terminal device and the gateway node, and establish the second IPsec connection between the terminal device and the gateway node; and send the fifth message to the gateway node by using the second IPsec connection, where the fifth message further carries the association parameter.

Optionally, the association parameter is a globally unique temporary user equipment identity GUTI, a security parameter index SPI, or a Cookie.

Optionally, the sending module 901 is specifically configured to:

when the fourth message carries a second failure cause value, end a first IPsec connection between the terminal device and the gateway node, and establish a second IPsec connection between the terminal device and the gateway node; and when the fourth message further carries a failure message or a registration reject message, send the fifth message to the gateway node by using the second IPsec connection, where the fifth message carries a registration request message, and the registration request message carries a permanent identifier of the terminal device.

Figure 10:
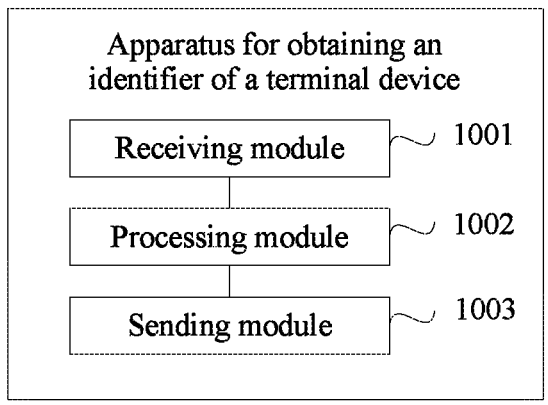
FIG. 10 is a schematic structural diagram of an apparatus for obtaining an identifier of a terminal device according to an embodiment of this application.

Referring to FIG. 10, an embodiment of this application provides an apparatus for obtaining an identifier of a terminal device. The apparatus is included in a control plane node, and the apparatus includes:

a receiving module 1001, configured to perform steps 303, 403, 503, 603, and 703 in the foregoing embodiments;

a processing module 1002, configured to perform steps 304, 404, 504, 604, and 704 in the foregoing embodiments; and a sending module 1003, configured to perform steps 305, 405, 505, 605, and 705 in the foregoing embodiments.

In the embodiments of this application, when the control plane node cannot obtain the context of the terminal device, the control plane node may send, to the gateway node, the third message used to request the permanent identifier of the terminal device, and then the gateway node may forward the third message to the terminal device, to return the obtained permanent identifier to the control plane node. Therefore, it can be learned that in the embodiments of this application, even if the control plane node obtains no context of the terminal device, the control plane node can obtain the permanent identifier of the terminal device through forwarding of the gateway node, so that it is possible that the terminal device successfully accesses a network. Compared with a prior-art access procedure in which access needs to be performed again once access fails, the method provided in the embodiments of this application makes an access procedure more convenient and more proper.

It should be noted that when the apparatuses for obtaining an identifier of a terminal device provided in the foregoing embodiments obtain an identifier of a terminal device, only division into the foregoing function modules is used as an example for description. During actual application, the foregoing functions may be allocated to different function modules for implementation based on a requirement. In other words, internal structures of the devices each are divided into different function modules for implementing all or some of the functions described above. In addition, the apparatuses for obtaining an identifier of a terminal device provided in the foregoing embodiments and the method embodiments for obtaining an identifier of a terminal device belong to a same concept. For specific implementation processes of the apparatuses, refer to the method embodiments. Details are not described herein again.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid state disk (SSD)), or the like.

A person of ordinary skill in the art may understand that all or some of the steps in the foregoing embodiments may be implemented by using hardware or by using a program instructing related hardware. The program may be stored in a computer-readable storage medium. The storage medium may be a read-only memory, a magnetic disk, an optical disc, or the like.

The foregoing descriptions are the embodiments provided in this application, and are not intended to limit this application. Any modification, equivalent replacement, improvement, or the like made without departing from the spirit and principle of this application should fall within the protection scope of this application.

What is claimed is:

1. A method for obtaining an identifier of a terminal device, wherein the method comprises:

sending, by a terminal device, a first message to a gateway node, wherein the first message carries a temporary identifier of the terminal device;

receiving, by the terminal device, a fourth message from the gateway node, wherein the fourth message responds to the first message, and the fourth message comprises at least one failure cause value, and wherein the fourth message further carries a first failure cause value, the first failure cause value notifies the terminal device that a first internet protocol security (IPsec) connection fails, the first failure cause value instructs the terminal device to send an association parameter to associate the first IPsec connection with a second IPsec connection, the association parameter is a parameter that associates the first IPsec connection with the second IPsec connection, and the second IPsec connection is an IPsec connection established after the first IPsec connection is disconnected;

ending, by the terminal device, the first IPsec connection between the terminal device and the gateway node, and establishing the second IPsec connection between the terminal device and the gateway node; and sending, by the terminal device, a fifth message to the gateway node based on the fourth message, wherein the fifth message carries a permanent identifier of the terminal device, and wherein the fourth message carries an identity request message, the identity request message requests the permanent identifier of the terminal device, the fifth message carries an identity reply message, the identity reply message responds to the identity request message, and the identity reply message carries the permanent identifier of the terminal device, and wherein the sending the fifth message to the gateway node comprises:

sending, by the terminal device, the fifth message to the gateway node by using the second IPsec connection, wherein the fifth message further carries the association parameter.

2. The method according to claim 1 wherein the association parameter is a globally unique temporary user equipment identity (GUTI), a security parameter index (SPI), or a Cookie.

3. A non-transitory computer readable medium comprising computer program codes stored thereon, executable by one or more digital processors for providing system configurations, the computer program codes including:

instructions for sending a first message to a gateway node, wherein the first message carries a temporary identifier of a terminal device;

instructions for receiving a fourth message from the gateway node, wherein the fourth message responds to the first message, and the fourth message comprises at least one failure cause value, and wherein the fourth message carries a second failure cause value and a failure message, the second failure cause value notifies the terminal device that a first IPsec connection fails, and the failure message notifies the terminal device that a control plane node cannot determine a permanent identifier of the terminal device;

instructions for ending the first IPsec connection between the terminal device and the gateway node and establishing a second IPsec connection to the gateway node; and instructions for sending a fifth message to the gateway node based on the fourth message by using the second IPsec connection, wherein the fifth message carries a registration request message, and the registration request message carries the permanent identifier of the terminal device.

4. An apparatus for obtaining an identifier of a terminal device, wherein the apparatus is comprised in a terminal device, and the apparatus comprises at least one processor coupled with a non-transitory storage medium storing executable instructions; wherein the executable instructions, when executed by the at least one processor, cause the at least one processor to:

send a first message to a gateway node, wherein the first message carries a temporary identifier of the terminal device;

receive a fourth message from the gateway node, wherein the fourth message responds to the first message, and the fourth message comprises at least one failure cause value, wherein the fourth message carries a second failure cause value and a registration reject message, and the second failure cause value notifies the terminal device that a first IPsec connection fails;

end the first IPsec connection between the terminal device and the gateway node, establish a second IPsec connection to the gateway node; and send a fifth message to the gateway node based on the fourth message by using the second IPsec connection, wherein the fifth message carries a registration request message, and the registration request message carries a permanent identifier of the terminal device.

\* \* \* \* \*

UNITED STATES PATENT AND TRADEMARK OFFICE
CERTIFICATE OF CORRECTION

PATENT NO. : 11,284,456 B2  
APPLICATION NO. : 16/751551  
DATED : March 22, 2022  
INVENTOR(S) : He Li, Jing Chen and Huan Li Page 1 of 1

It is certified that error appears in the above-identified patent and that said Letters Patent is hereby corrected as shown below:

On the Title Page

In Column 1 (Item (63), Related US Appln Data), Line 2 delete "CN2015" and insert --CN2018--.

Signed and Sealed this  
Seventh Day of June, 2022

Katherine Kelly Vidal  
*Director of the United States Patent and Trademark Office*